United States Patent
Nagata et al.

(10) Patent No.: US 11,232,769 B2
(45) Date of Patent: Jan. 25, 2022

(54) IMAGE DISPLAY SYSTEM, INFORMATION PROCESSING APPARATUS, INFORMATION PROCESSING METHOD, PROGRAM, AND MOBILE OBJECT

(71) Applicant: Sony Corporation, Tokyo (JP)

(72) Inventors: Koji Nagata, Tokyo (JP); Takashi Saitoh, Kanagawa (JP); Yoshinori Nasada, Kanagawa (JP); Tomoya Takei, Tokyo (JP); Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/979,877

(22) PCT Filed: Feb. 1, 2019

(86) PCT No.: PCT/JP2019/003672
§ 371 (c)(1),
(2) Date: Sep. 11, 2020

(87) PCT Pub. No.: WO2019/181233
PCT Pub. Date: Sep. 26, 2019

(65) Prior Publication Data
US 2020/0410963 A1 Dec. 31, 2020

(30) Foreign Application Priority Data
Mar. 19, 2018 (JP) .............................. JP2018-050844

(51) Int. Cl.
*G09G 5/38* (2006.01)
*B60K 35/00* (2006.01)
(Continued)

(52) U.S. Cl.
CPC .............. *G09G 5/38* (2013.01); *B60K 35/00* (2013.01); *G02B 27/0179* (2013.01);
(Continued)

(58) Field of Classification Search
None
See application file for complete search history.

(56) References Cited

U.S. PATENT DOCUMENTS

| 2004/0100419 | A1 | 5/2004 | Kato |
| 2008/0180639 | A1* | 7/2008 | Amano ................ G03B 5/04 353/24 |

(Continued)

FOREIGN PATENT DOCUMENTS

| DE | 102014112077 A1 | 2/2016 |
| EP | 2166401 A1 | 3/2010 |

(Continued)

OTHER PUBLICATIONS

International Search Report and Written Opinion dated Apr. 23, 2019 for PCT/JP2019/003672 filed on Feb. 1, 2019, 9 pages including English Translation of the International Search Report.

*Primary Examiner* — Jwalant Amin
(74) *Attorney, Agent, or Firm* — Xsensus LLP

(57) ABSTRACT

An image display system according to an embodiment of the present technology includes an image display unit, an acquisition unit, and a display control unit. The image display unit is capable of displaying an image and moves in association with a movement of a user. The acquisition unit acquires movement information regarding a movement of the image display unit. The display control unit causes the image display unit to execute suppression image display for suppressing an influence of the movement of the image display unit with respect to an external space on the basis of the acquired movement information.

19 Claims, 20 Drawing Sheets

(51) Int. Cl.
  G02B 27/01       (2006.01)
  G09G 5/373       (2006.01)
(52) U.S. Cl.
  CPC .......... G09G 5/373 (2013.01); *B60K 2370/12* (2019.05); *B60K 2370/152* (2019.05); *B60K 2370/18* (2019.05); *G02B 2027/0183* (2013.01); *G09G 2320/0261* (2013.01); *G09G 2340/14* (2013.01); *G09G 2380/10* (2013.01)

(56) References Cited

U.S. PATENT DOCUMENTS

| | | | |
|---|---|---|---|
| 2010/0066832 A1* | 3/2010 | Nagahara | G02B 7/1822 348/148 |
| 2013/0293967 A1* | 11/2013 | Hayakawa | G02B 15/1461 359/684 |
| 2018/0196241 A1* | 7/2018 | Shibayama | G02B 27/0037 |
| 2019/0199984 A1* | 6/2019 | Sato | H04N 9/3185 |
| 2019/0317387 A1* | 10/2019 | Hanzawa | H04N 5/74 |

FOREIGN PATENT DOCUMENTS

| | | |
|---|---|---|
| JP | 2012-019452 A | 1/2012 |
| JP | 2012-109708 A | 6/2012 |
| JP | 2015-019274 A | 1/2015 |
| JP | 2017-171243 A | 9/2017 |
| WO | 2015/146805 A1 | 10/2015 |

\* cited by examiner

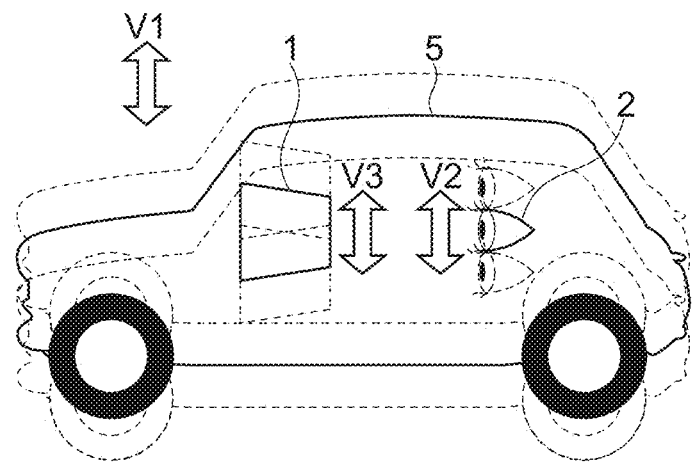
FIG.4
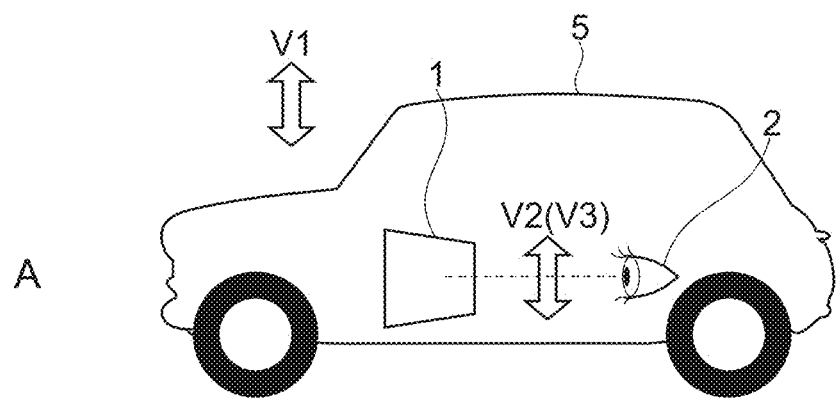
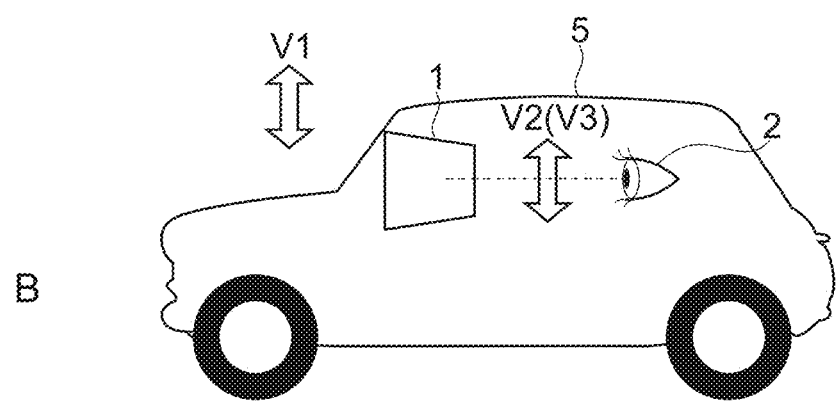
FIG.5

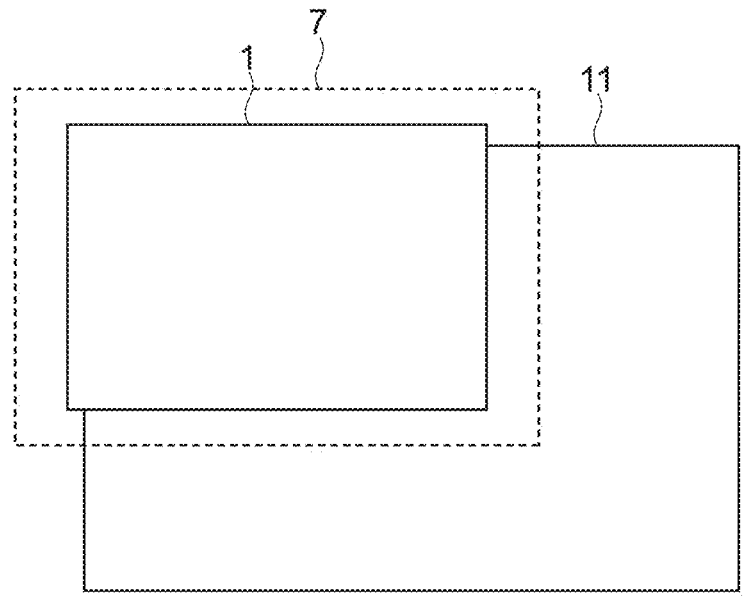
A
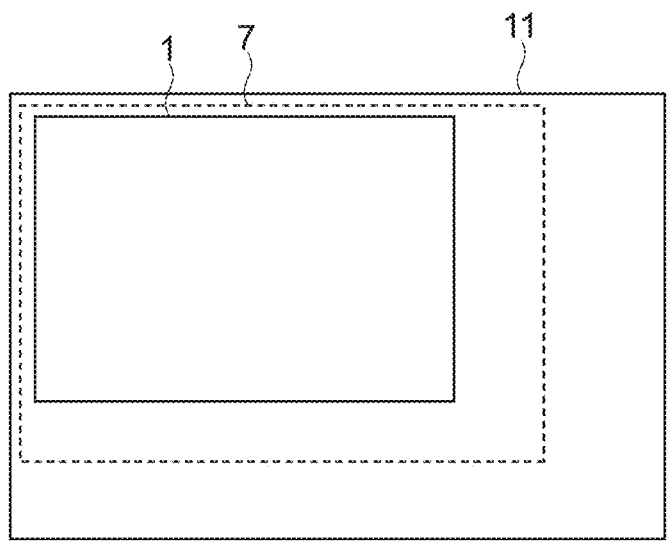
B
FIG.12

FIG.17
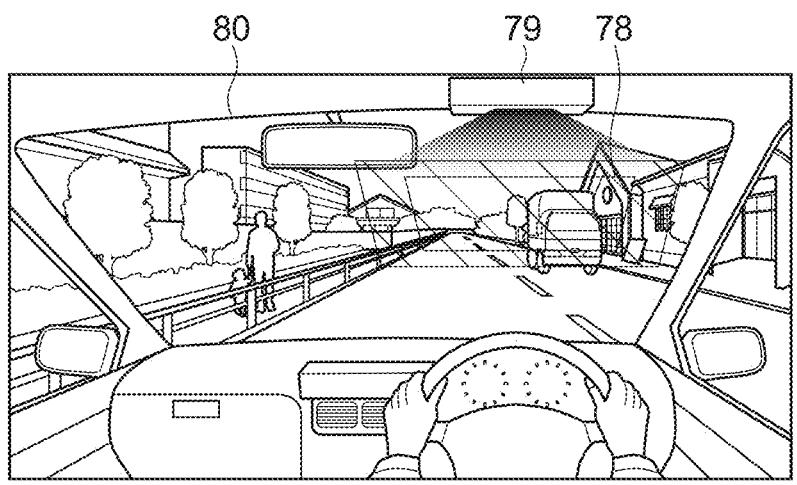
A
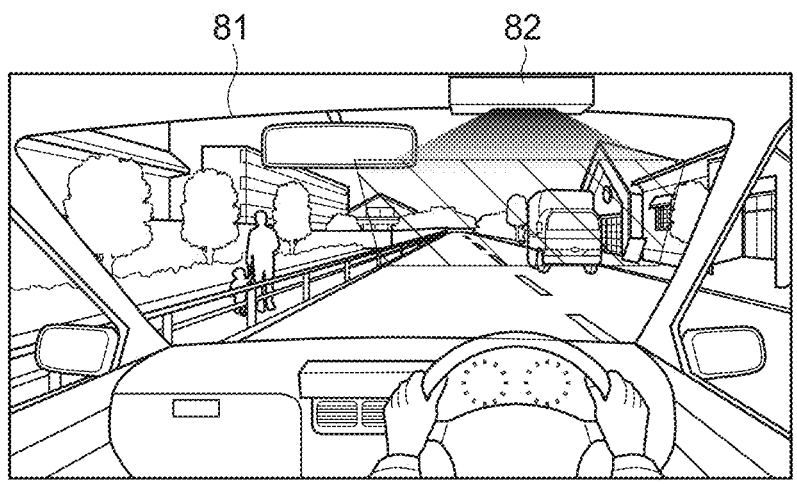
B
FIG.18
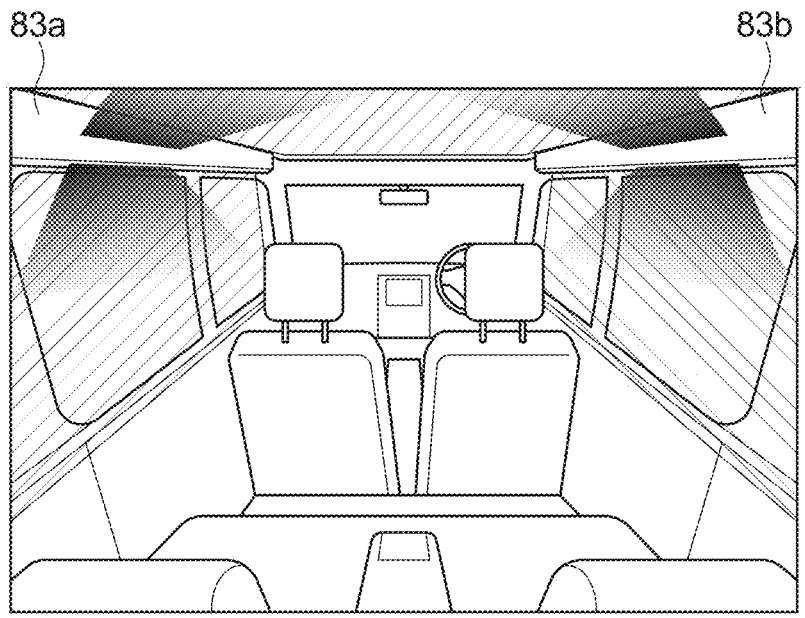

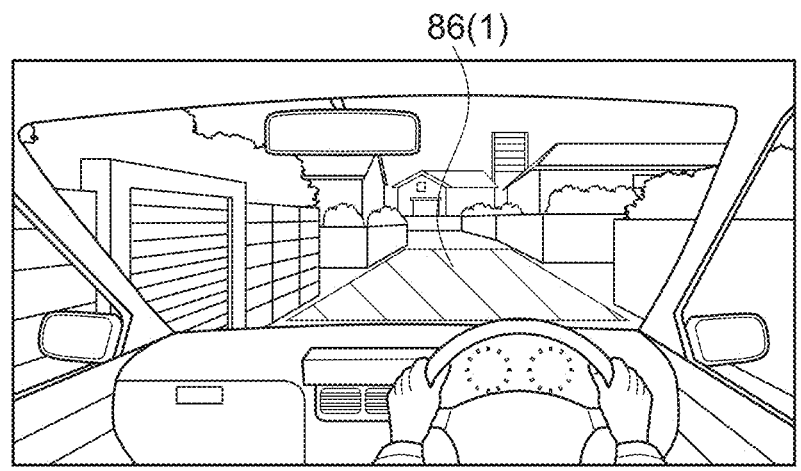
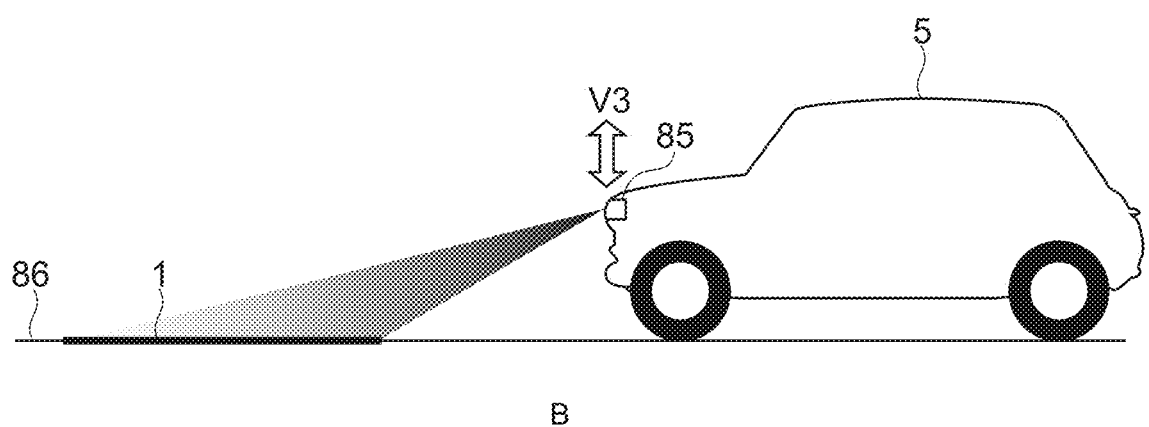
FIG.19

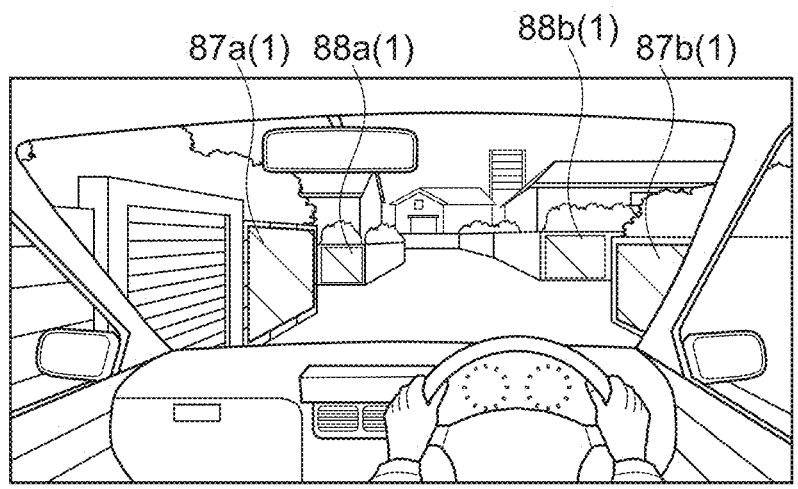
A
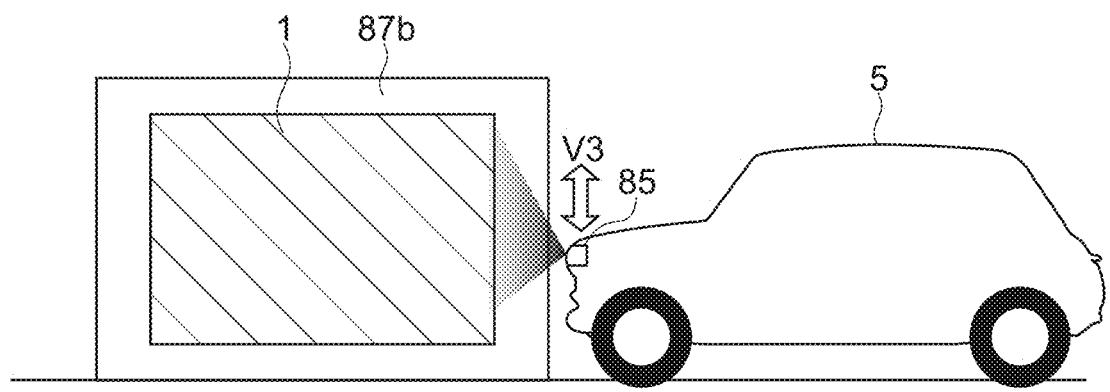
B
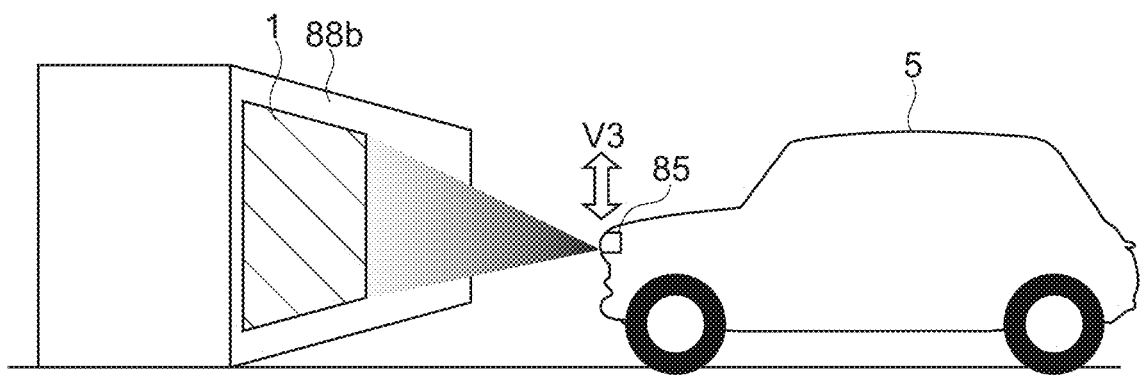
C
FIG.20

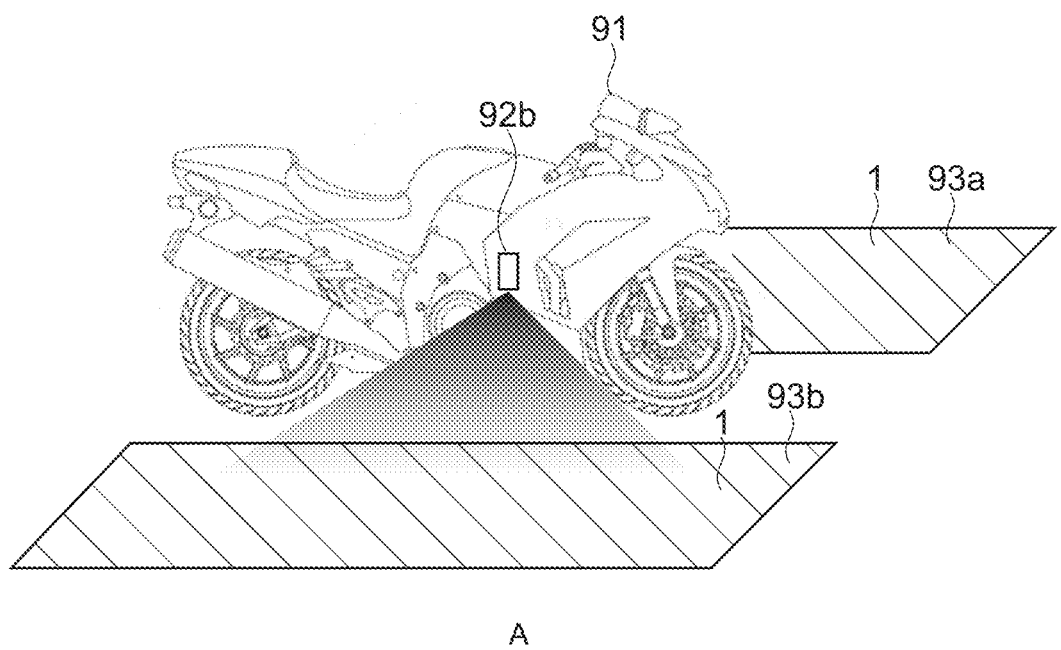
A
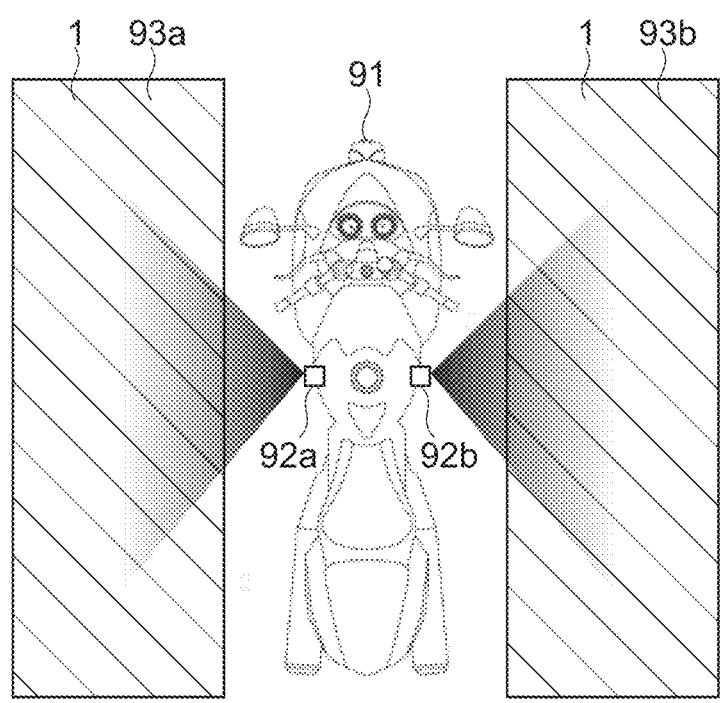
B
FIG.22

IMAGE DISPLAY SYSTEM, INFORMATION PROCESSING APPARATUS, INFORMATION PROCESSING METHOD, PROGRAM, AND MOBILE OBJECT

CROSS-REFERENCE TO RELATED APPLICATIONS

The present application is based on PCT filing PCT/JP2019/003672, filed Feb. 1, 2019, which claims priority to JP 2018-050844, filed Mar. 19, 2018, the entire contents of each are incorporated herein by reference.

TECHNICAL FIELD

The present technology relates to an image display system, an information processing apparatus, an information processing method, a program, and a mobile object that can be mounted on a vehicle or the like.

BACKGROUND ART

Patent Literature 1 discloses a monitor display system for a vehicle capable of suppressing motion sickness due to viewing of a monitor or the like of a passenger. In this display system, the displacement frequency of an image monitor is calculated on the basis of vibration input from a road surface to the vehicle. Further, the displacement frequency of the eye line of a passenger is calculated on the basis of an image of the passenger. The position of the display range of the image is then controlled such that the difference between the displacement frequency of the image monitor and the displacement frequency of the eye line of the passenger is not included in the frequency range in which the motion sickness due to viewing of a monitor is caused (paragraphs [0034] and [0037], FIG. 6, etc. in the specification of Patent Literature 1).

CITATION LIST

Patent Literature

Patent Literature 1: Japanese Patent Application Laid-open No. 2017-171243

DISCLOSURE OF INVENTION

Technical Problem

Thus, there is a need for a technique that can provide a user with a comfortable viewing environment.

In view of the above circumstances, it is an object of the present technology to provide an image display system, an information processing apparatus, an information processing method, a program, and a mobile object that can provide a comfortable viewing environment.

Solution to Problem

In order to achieve the object described above, an image display system according to an embodiment of the present technology includes an image display unit, an acquisition unit, and a display control unit.

The image display unit is capable of displaying an image and moves in association with a movement of a user.

The acquisition unit acquires movement information regarding a movement of the image display unit.

The display control unit causes the image display unit to execute suppression image display for suppressing an influence of the movement of the image display unit with respect to an external space on the basis of the acquired movement information.

In this image display system, it is possible to cause the image display unit, which moves in association with the movement of the user, to execute suppression image display for suppressing the influence of the movement of the image display unit with respect to the external space. This makes it possible to provide a comfortable viewing environment.

The suppression image display may include image display for canceling the influence of the movement of the image display unit.

The suppression image display may include image display for moving the image relative to the user in response to the movement of the user.

The suppression image display may include image display for suppressing the image from moving in response to the movement of the image display unit.

The suppression image display may include image display for suppressing a discrepancy between a sensation perceived by the user due to the movement of the user and a sensation perceived by the user when viewing the image.

The suppression image display may include image display for enabling the user to view the image in such a manner as to see a scene.

The suppression image display may include controlling a display state of the image.

The suppression image display may include controlling at least one of a display size of the image, a display position of the image, or a shape of the image.

The image display unit may include an image projection unit that projects the image, and a projected unit on which the image is to be projected. In this case, the movement information may include at least one of movement information regarding a movement of the image projection unit or movement information regarding a movement of the projected unit.

The suppression image display may include image display for suppressing an influence of a relative movement between the image projection unit and the projected unit.

The image projection unit may include an image moving mechanism capable of optically moving a display position of the image to be projected. In this case, the suppression image display may include control of the image moving mechanism.

The suppression image display may include moving the image within a projection area of the image projection unit by processing image information of the image to be projected.

The suppression image display may include moving the image within a projection area of the image projection unit by processing image information of the image to be projected. In this case, the display control unit may detect the influence of the movement of the image display unit on the image to be projected on the basis of the acquired movement information, and set each of a control content of the image moving mechanism and a processing content of the image information on the basis of the detected influence.

The display control unit may set each of the control content of the image moving mechanism and the processing content of the image information such that the control of the image moving mechanism takes precedence over processing of the image information.

The image display system may be mounted on a mobile object capable of moving the user riding thereon.

The image display system may be mounted on a wearable object to be worn by the user.

The image display unit may vibrate.

An information processing apparatus according to an embodiment of the present technology includes an acquisition unit and a display control unit.

The acquisition unit acquires movement information regarding a movement of an image display unit that is capable of displaying an image and moves in association with a movement of a user.

The display control unit causes the image display unit to execute suppression image display for suppressing an influence of the movement of the image display unit with respect to an external space on the basis of the acquired movement information.

An information processing method according to an embodiment of the present technology is an information processing method that is executed by a computer system, the information processing method including: acquiring movement information regarding a movement of an image display unit that is capable of displaying an image and moves in association with a movement of a user; and executing, by the image display unit, suppression image display for suppressing an influence of the movement of the image display unit with respect to an external space on the basis of the acquired movement information.

A program according to an embodiment of the present technology is a program that causes a computer system to execute the steps of: acquiring movement information regarding a movement of an image display unit that is capable of displaying an image and moves in association with a movement of a user; and executing, by the image display unit, suppression image display for suppressing an influence of the movement of the image display unit with respect to an external space on the basis of the acquired movement information.

Advantageous Effects of Invention

A mobile object according to an embodiment of the present technology includes a main body unit, an image display unit, an acquisition unit, and a display control unit.

The main body unit includes a riding unit on which a user is capable of riding.

The image display unit is provided to the main body unit and is capable of displaying an image.

The acquisition unit acquires movement information regarding a movement of the image display unit provided to the main body unit.

The display control unit causes the image display unit to execute suppression image display for suppressing an influence of the movement of the image display unit with respect to an external space on the basis of the acquired movement information.

As described above, according to the present technology, it is possible to provide a comfortable viewing environment. Note that the effects described herein are not necessarily limited and any one of the effects described in this disclosure may be produced.

BRIEF DESCRIPTION OF DRAWINGS

FIG. 4 is a schematic diagram for describing the outline of image display by the image display system.

FIG. 5 is a schematic diagram for describing the outline of the image display by the image display system.

FIG. 12 is a schematic diagram for describing the outline of suppression image display according to a second embodiment of the present technology.

FIG. 17 is a schematic diagram illustrating variation examples of the HUD.

FIG. 18 is a schematic diagram illustrating a variation example of the image display system.

FIG. 19 is a schematic diagram for describing an image display system according to another embodiment.

FIG. 20 is a schematic diagram for describing an image display system according to another embodiment.

FIG. 22 is a schematic diagram for describing an image display system according to another embodiment.

MODE(S) FOR CARRYING OUT THE INVENTION

Hereinafter, embodiments of the present technology will be described with reference to the drawings.

First Embodiment

Figure 1:
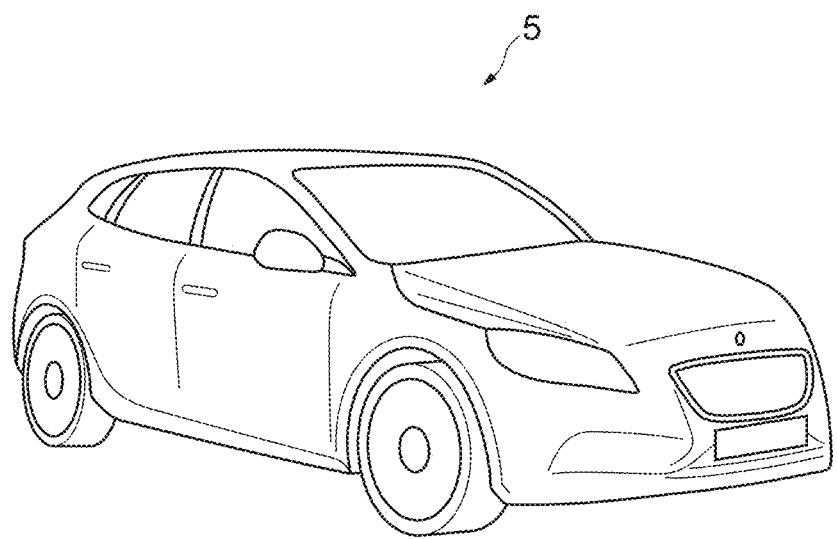
FIG. 1 is an external view illustrating a configuration example of a vehicle according to a first embodiment of the present technology.

FIG. 1 is an external view illustrating a configuration example of a vehicle according to a first embodiment of the present technology. A vehicle 5 has an autonomous driving function capable of automatically driving to a destination. The vehicle 5 is an embodiment of a mobile object according to the present technology and corresponds to a mobile object capable of moving the user riding thereon.

Figure 2:
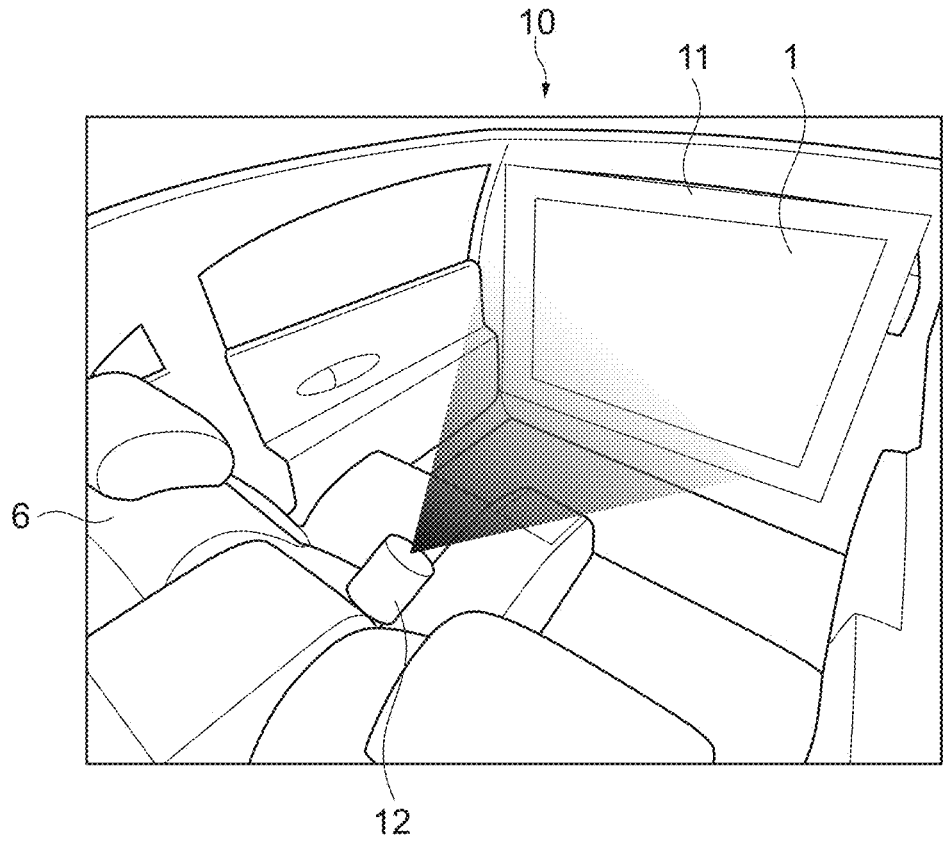
FIG. 2 is a schematic diagram illustrating an example of an image display system mounted in the vehicle.

FIG. 2 is a schematic diagram illustrating an example of an image display system mounted in the vehicle 5. An image display system 10 includes a screen 11 and a projector 12.

The screen 11 is installed between a front side seat, including a driver seat and a passenger seat, and a rear seat 6. For example, the screen 11 may be wound in a roll shape on a ceiling portion or a side surface portion of the interior of the vehicle 5 to be accommodated, and may be set by being pulled out by the user. In addition, other methods for installing and accommodating the screen 11 are not limited, and any method may be employed.

The size (aspect ratio), shape, material, and the like of the screen 11 are not limited and may be optionally designed. Further, the present technology is also applicable to a screen having a curved surface shape without being limited to a flat screen.

The projector 12 is disposed at substantially the center of the rear seat 6, facing the front side. The projector 12 projects an image 1 toward the screen 11. The image 1 includes both a still image and a moving image (video). Of course, the image 1 includes a plurality of frame images constituting a moving image (video). Hereinafter, the display or the like of the image 1 may be referred to as display or the like of a video.

A configuration example or the like of the projector 12 will be described later.

In this embodiment, the projector 12 and the screen 11 achieve an image display unit capable of displaying images. In this embodiment, the projector 12 functions as an image projection unit that projects images. Further, the screen 11 functions as a projected unit on which images are projected.

Further, in this embodiment, the exterior and the interior of the vehicle body (body) of the vehicle 5 correspond to a main body unit, and the seat such as the rear seat 6 corresponds to a riding unit on which a user is capable of riding. Thus, the image display system 10 is provided in the main body unit.

Figure 3:
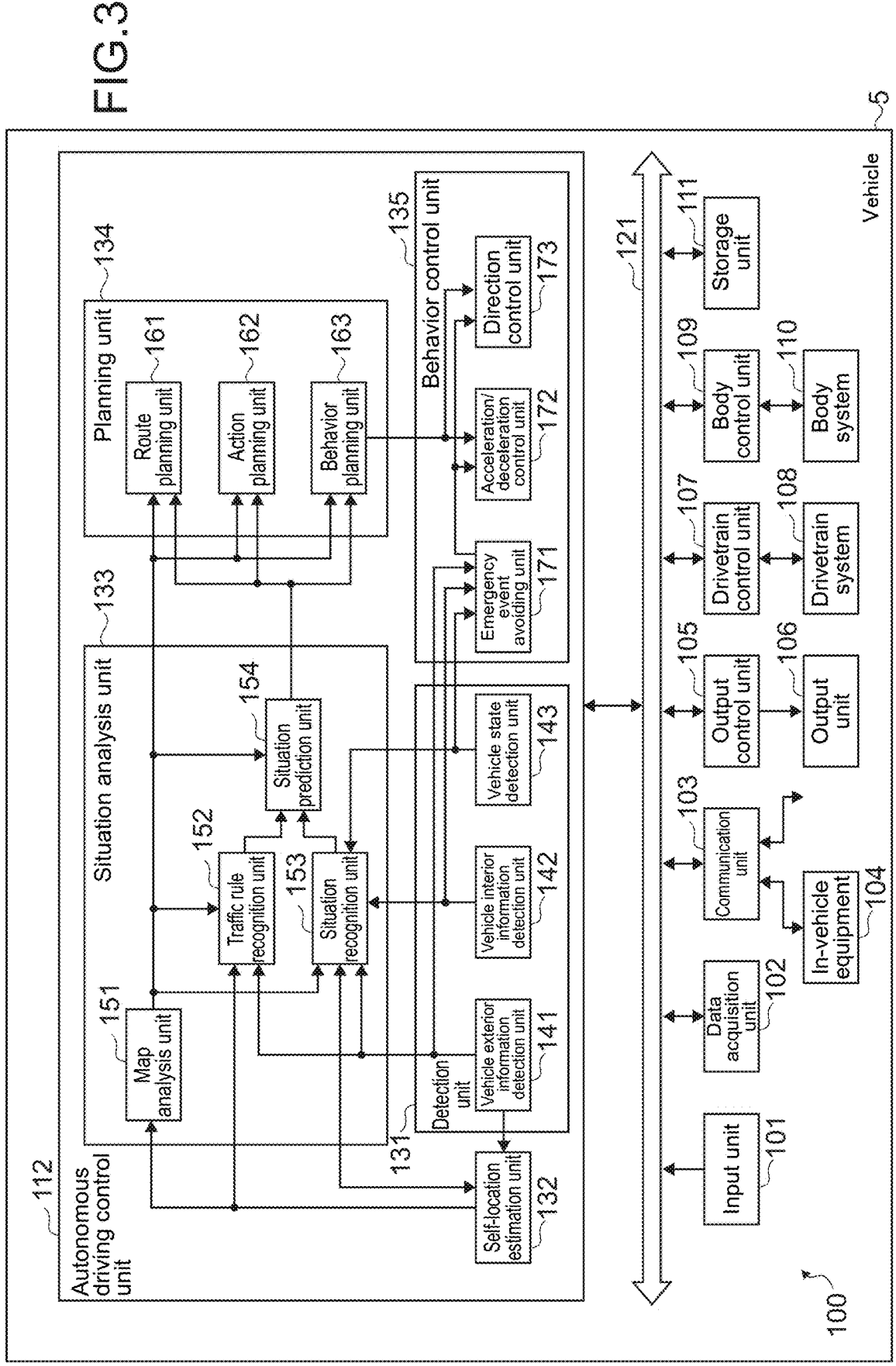
FIG. 3 is a block diagram illustrating a configuration example of a vehicle control system that controls a vehicle.

FIG. 3 is a block diagram illustrating a configuration example of a vehicle control system 100 that controls the vehicle 5. The vehicle control system 100 is a system that is provided in the vehicle 5 and that controls the vehicle 5 in various ways.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay (registered trademark), or the like. Note that sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the vehicle 5. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

Further, for example, the data acquisition unit 102 includes various kinds of sensors for detecting information regarding the outside of the vehicle 5. Specifically, for example, the data acquisition unit 102 includes an imaging apparatus (vehicle exterior camera) such as a time-of-flight (ToF) camera, a stereo camera, a monocular camera, an infrared camera, or another camera. Further, for example, the data acquisition unit 102 includes an environment sensor for detecting weather, a meteorological phenomenon, or the like, and a surrounding information detection sensor for detecting objects around the vehicle 5. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

Furthermore, for example, the data acquisition unit 102 includes various kinds of sensors for detecting a current location of the vehicle 5. Specifically, for example, the data acquisition unit 102 includes a global navigation satellite system (GNSS) receiver or the like. The GNSS receiver receives satellite signals (hereinafter, referred to as GNSS signals) from a GNSS satellite serving as a navigation satellite.

Further, for example, the data acquisition unit 102 includes various kinds of sensors for detecting information regarding the inside of the vehicle. Specifically, for example, the data acquisition unit 102 includes an imaging apparatus (vehicle interior camera) that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a base station, or the like, transmits data supplied by the respective units of the vehicle control system 100, and supplies the received data to the respective units of the vehicle control system 100. Note that a communication protocol supported by the communication unit 103 is not specifically limited. Further, it is also possible for the communication unit 103 to support a plurality of types of communication protocols.

For example, the communication unit 103 establishes wireless connection with the in-vehicle equipment 104 by using a wireless LAN, Bluetooth (registered trademark), near-field communication (NFC), wireless USB (WUSB), or the like. Further, for example, the communication unit 103 establishes wired connection with the in-vehicle equipment 104 by using Universal Serial Bus (USB), High-Definition Multimedia Interface (HDMI), Mobile High-Definition Link (MHL), or the like via a connection terminal (and a cable if necessary) (not illustrated).

Furthermore, for example, the communication unit 103 communicates with equipment (for example, an application server or a control server) present on an external network (for example, the Internet, a cloud network, or a company-specific network) via a base station or an access point. Further, for example, the communication unit 103 communicates with a terminal (for example, a terminal of a pedestrian or a store, or a machine-type communication (MTC) terminal) present in the vicinity of the vehicle 5 by using a peer-to-peer (P2P) technology. Furthermore, for example, the communication unit 103 carries out V2X communication such as vehicle-to-vehicle communication, vehicle-to-infrastructure communication, vehicle-to-home communication between the vehicle 5 and a home, or vehicle-to-pedestrian communication.

Further, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the vehicle 5, a navigation apparatus that searches for a route to any destination, and the like, for example.

The output control unit 105 controls output of various kinds of information to the passenger of the vehicle 5 or to an outside of the vehicle 5. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. Further, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the passenger or the outside of the vehicle 5. For example, the output unit 106 includes a display apparatus, an instrument panel, a sound system such as an audio speaker, headphones, a wearable device such as an eyeglass type display worn by the passenger or the like, a projector, a lamp, or the like. Instead of an apparatus including a usual display, the display apparatus included in the output unit 106 may be, for example, an apparatus that displays the visual information within a field of view of the driver such as a head-up display, a transparent display, or an apparatus having an augmented reality (AR) function.

The drivetrain control unit 107 generates various kinds of control signals, supplies them to the drivetrain system 108, and thereby controls the drivetrain system 108. Further, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the vehicle 5. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. Further, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map, and a local map. The high-accuracy map is a dynamic map or the like. The global map has lower accuracy than the high-accuracy map but covers wider area than the high-accuracy map. The local map includes information regarding surroundings of the vehicle 5.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the vehicle 5, following driving based on a following distance, vehicle speed maintaining driving, a warning of collision of the vehicle 5, a warning of deviation of the vehicle 5 from a lane, or the like. Further, for example, it is also possible for the autonomous driving control unit 112 to perform cooperative control intended for autonomous driving that makes the vehicle travel autonomously without depending on the operation of the driver or the like. The autonomous driving control unit 112 includes a detection unit 131, a self-location estimation unit 132, a situation analysis unit 133, a planning unit 134, and a behavior control unit 135.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the vehicle 5 on the basis of data or signals from the respective units of the vehicle control system 100. For example, the vehicle exterior information detection unit 141 performs a detection process, a recognition process, a tracking process of objects around the vehicle 5, and a process of detecting distances to the objects. Examples of the detection target object include a vehicle, a person, an obstacle, a structure, a road, a traffic light, a traffic sign, a road sign, and the like. Further, for example, the vehicle exterior information detection unit 141 performs a process of detecting an ambient environment around the vehicle 5. Examples of the ambient environment around the detection target include weather, temperature, humidity, brightness, a road surface condition, and the like, for example. The vehicle exterior information detection unit 141 supplies data indicating results of the detection processes to the self-location estimation unit 132, a map analysis unit 151, a traffic rule recognition unit 152, and a situation recognition unit 153 of the situation analysis unit 133, an emergency event avoiding unit 171 of the behavior control unit 135, and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the vehicle 5 on the basis of data or signals from the respective units of the vehicle control system 100. Examples of the state of the vehicle 5, which is a detection target, includes speed, acceleration, a steering angle, presence/absence of abnormality, a content of the abnormality, a driving operation state, a position and inclination of the power seat, a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self-location estimation unit 132 performs a process of estimating a location, a posture, and the like of the vehicle 5 on the basis of data or signals from the respective units of the vehicle control system 100 such as the vehicle exterior information detection unit 141 and the situation recognition unit 153 of the situation analysis unit 133. Further, as necessary, the self-location estimation unit 132 generates a local map (hereinafter, referred to as a self-location estimation map) to be used for estimating a self-location. For example, the self-location estimation map may be a high-accuracy map using a technology such as simultaneous localization and mapping (SLAM). The self-location estimation unit 132 supplies data indicating a result of the estimation process to the map analysis unit 151, the traffic rule recognition unit 152, and the situation recognition unit 153 of the situation analysis unit 133, and the like. Further, the self-location estimation unit 132 causes the storage unit 111 to store the self-location estimation map.

The situation analysis unit 133 performs a process of analyzing a situation of the vehicle 5 and a situation around the vehicle 5. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self-location estimation unit 132 and the vehicle exterior information detection unit 141 as necessary. The map analysis unit 151 supplies the constructed map to the traffic rule recognition unit 152, the situation recognition unit 153, and the situation prediction unit 154, and to a route planning unit 161, an action planning unit 162, a behavior planning unit 163 of the planning unit 134, and the like.

The traffic rule recognition unit 152 performs a process of recognizing traffic rules around the vehicle 5 on the basis of data or signals from the respective units of the vehicle control system 100 such as the self-location estimation unit 132, the vehicle exterior information detection unit 141, and the map analysis unit 151. The recognition process makes it possible to recognize locations and states of traffic lights around the vehicle 5, contents of traffic control around the vehicle 5, a drivable lane, and the like, for example. The traffic rule recognition unit 152 supplies data indicating a result of the recognition process to the situation prediction unit 154 and the like.

The situation recognition unit 153 performs a process of recognizing situations related to the vehicle 5 on the basis of data or signals from the respective units of the vehicle control system 100 such as the self-location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the vehicle 5, a situation around the vehicle 5, a situation of the driver of the vehicle 5, and the like. Further, as necessary, the situation recognition unit 153 generates a local map (hereinafter, referred to as a situation recognition map) to be used for recognizing the situation around the vehicle 5. For example, the situation recognition map may be an occupancy grid map.

Examples of the situation of the vehicle 5, which is a recognition target, include a location, a posture, and movement (such as speed, acceleration, or a movement direction, for example) of the vehicle 5, presence/absence of abnormality, contents of the abnormality, and the like. Examples of the situation around the vehicle 5, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self-location estimation unit 132, the situation prediction unit 154, and the like. Further, the situation recognition unit 153 causes the storage unit 111 to store the situation recognition map.

The situation prediction unit 154 performs a process of predicting a situation related to the vehicle 5 on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the vehicle 5, a situation around the vehicle 5, a situation of the driver, and the like.

Examples of the situation of the vehicle 5, which is a prediction target, includes behavior of the vehicle 5, occurrence of abnormality, a drivable distance, and the like. Examples of the situation around the vehicle 5, which is a prediction target, includes behavior of moving objects, change in states of traffic lights, change in environments such as weather, and the like around the vehicle 5. Examples of the situation of the driver, which is a prediction target, include behavior, a health condition, and the like of the driver.

The situation prediction unit 154 supplies data indicating results of the prediction processes to the route planning unit 161, the action planning unit 162, and the behavior planning unit 163 of the planning unit 134 and the like in addition to the data from the traffic rule recognition unit 152 and the situation recognition unit 153.

The route planning unit 161 plans a route to a destination on the basis of data or signals from the respective units of the vehicle control system 100 such as the map analysis unit 151 and the situation prediction unit 154. For example, the route planning unit 161 sets a route from the current location to a specified destination on the basis of the global map. Further, for example, the route planning unit 161 appropriately changes the route on the basis of situations such as traffic congestion, accidents, traffic regulation, and constructions, and a health condition and the like of the driver. The route planning unit 161 supplies data indicating the planned route to the action planning unit 162 and the like.

The action planning unit 162 plans an action of the vehicle 5 for driving safely in the route planned by the route planning unit 161 within a planned time period, on the basis of data or signals from the respective units of the vehicle control system 100 such as the map analysis unit 151 and the situation prediction unit 154. For example, the action planning unit 162 plans start, stop, a driving direction (for example, forward, backward, left turn, right turn, change of direction, etc.), a driving lane, driving speed, overtaking, and the like. The action planning unit 162 supplies data indicating the action planned for the vehicle 5 to the behavior planning unit 163 and the like.

The behavior planning unit 163 plans behavior of the vehicle 5 for achieving the action planned by the action planning unit 162 on the basis of data or signals from the respective units of the vehicle control system 100 such as the map analysis unit 151 and the situation prediction unit 154. For example, the behavior planning unit 163 plans acceleration, deceleration, a driving course, and the like. The behavior planning unit 163 supplies data indicating the planed behavior of the vehicle 5 to an acceleration/deceleration control unit 172, a direction control unit 173, and the like of the behavior control unit 135.

The behavior control unit 135 controls behavior of the vehicle 5. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle 5 on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the vehicle 5 such as a quick stop or a quick turn for avoiding the emergency event. The emergency event avoiding unit 171 supplies data indicating the planned behavior of the vehicle 5 to the acceleration/deceleration control unit 172, the direction control unit 173, and the like.

The acceleration/deceleration control unit 172 controls acceleration/deceleration to achieve the behavior of the vehicle 5 planned by the behavior planning unit 163 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the vehicle 5 planned by the behavior planning unit 163 or the emergency event avoiding unit 171. For example, the direction control unit 173 computes a control goal value of the steering mechanism to achieve a driving course or quick turn planned by the behavior planning unit 163 or the emergency event avoiding unit 171, and supplies a control instruction indicating the computed control goal value to the drivetrain control unit 107.

Figure 6:
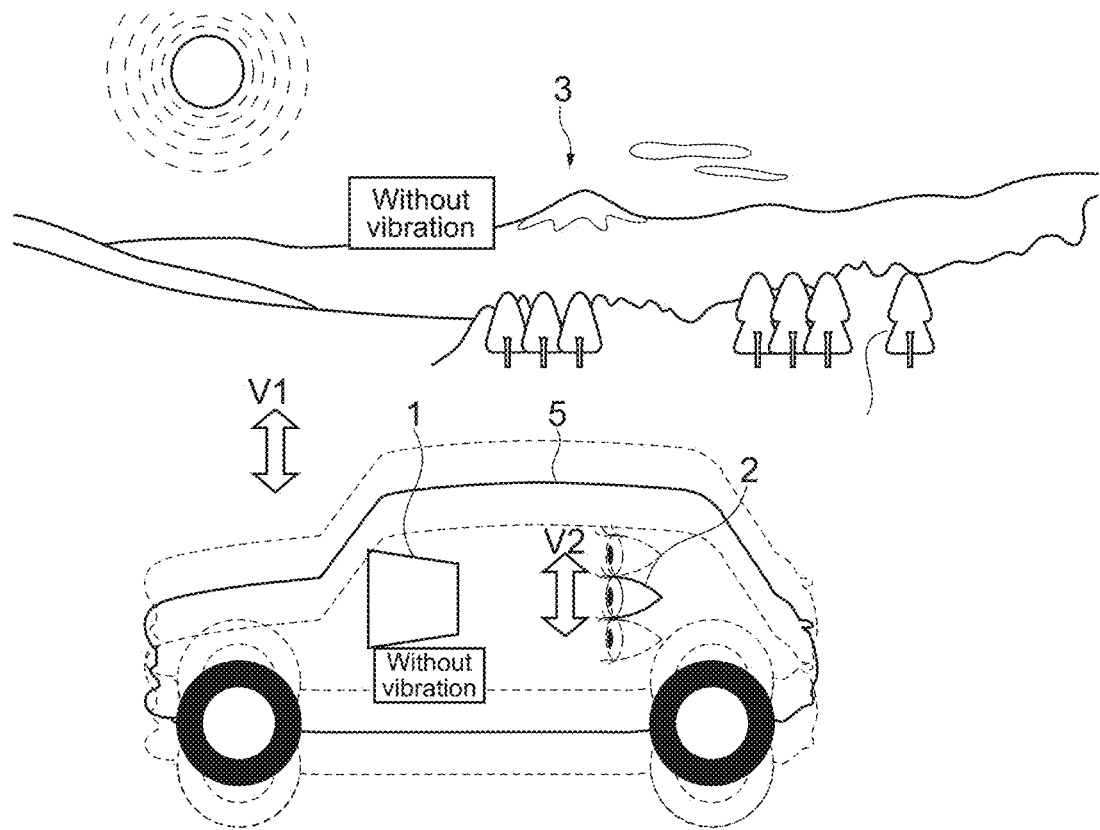
FIG. 6 is a schematic diagram for describing the outline of the image display by the image display system.

FIGS. 4 to 6 are schematic diagrams for describing the outline of image display by the image display system 10.

As described with reference to FIG. 2, the projector 12 and the screen 11 are mounted in the vehicle 5. Thus, depending on the movement of the vehicle 5, a user riding on the vehicle 5, and the projector 12 and the screen 11 will move together. For example, if the vehicle 5 vibrates, the user vibrates accordingly, and the projector 12 and the screen 11 also vibrate.

At that time, the movement of the user and the movement of the projector 12 and the screen 11 are associated with each other. That is, the projector 12 and the screen 11 constituting the image display unit move in association with the movement of the user.

For example, when an object A moves, a force for moving an object is generated, and when the force acts to move another object B, the movement of the object A and the movement of the object B are included in the movement associated with each other. Further, it is assumed that an object C different from the object B also moves due to the force generated by the movement of the object A. In this case, the movement of the object B and the movement of the object C are included in the movement associated with each other.

That is, not only the movement of the object A and the movement of the object B moved by the object A, but also the movement of each of the objects B and C moved at the same timing by the object A are included in the movement associated with each other. Note that such a movement will also be referred to as a movement interlocked with each other.

In accordance with the movement of the object A, the object B relatively moves when viewed from the object A. Such a state is not included in the movement associated with each other. If there is any relationship between the movement of the object A itself and the movement of the object B itself, these movements are included in the movement associated with each other.

As schematically illustrated in FIG. 4, when the vehicle 5 vibrates (arrow V1), the user riding on the vehicle 5 (user's eye 2) also shakes (arrow V2). Since the projector 12 and the screen 11 also vibrate, the image 1 displayed on the screen 11 also shakes (arrow V3).

For example, a display position of the image 1 is assumed to be fixed at a predetermined position in the vehicle 5. That is, it is assumed that the image 1 is localized in the vehicle interior space. In this case, the vibration of the vehicle 5 becomes the vibration of the image 1, which is accompanied by discomfort in viewing of the image 1.

For example, when the vehicle 5 accelerates, decelerates, turns, or moves up and down, the user is subjected to an inertial force due to those motions, but since the image 1 is fixed in the vehicle without moving, a discrepancy in sensation occurs. That is, there is a deviation between the sensation corresponding to the stimulus applied to the inner ear and the sensation obtained through the vision. This discrepancy in the sensation becomes a cause of motion sickness.

For example, as illustrated in FIG. 5, the display position of the image 1 is displaced so as to follow the movement of the user's eye 2. This allows the user to view the image 1 relatively static and allows the image 1 to be localized in a user space. Even in this case, it is difficult to comfortably view the image 1 because a difference occurs between the sensation corresponding to the stimulus applied to the inner ear and the sensation obtained through the vision.

The inventors of the present technology have newly devised image display according to the present technology, focusing on a discrepancy in sensation that is a cause of motion sickness. Specifically, as illustrated in FIG. 6, in the image display newly devised, the image 1 is displayed for the user (user's eye 2) while being separated from the vibration of the projector 12 and the screen 11 caused by the vibration of the vehicle 5.

That is, it is possible for the user to view the image 1 without vibration (which is a state without vibration with respect to the ground and is relatively vibrating because the user is vibrating). This makes it possible to provide the user with a viewing environment providing the same feeling as looking at a scene 3 outside the vehicle, and to reduce discomfort such as motion sickness.

As specific processing, the image display for suppressing the influence of the movement (vibration V3) of the projector 12 and the screen 11 constituting the image display unit with respect to the external space is executed (hereinafter, referred to as suppression image display). The suppression image display may also be referred to as image display for suppressing the influence of the movement (vibration V3) of the projector 12 and the screen 11 when viewed from the external space. Further, the image display system 10 capable of executing the suppression image display can also be referred to as an image display system 10 with a vibration isolation function (anti-vibration function).

The suppression image display includes any image display for canceling the influences of the movement (vibration V3) of the projector 12 and the screen 11. This makes it possible to achieve a viewing environment in which the image 1 is displayed for the user while being separated from the vibration of the projector 12 and the screen 11.

Further, the suppression image display includes any image display for moving the image 1 relative to the user in response to the movement of the user (vibration V2). In other words, the suppression image display includes any image display for suppressing the image 1 from moving in response to the movement (vibration V3) of the projector 12 and the screen 11. This makes it possible to suppress the discrepancy between the sensation corresponding to the stimulus applied to the inner ear and the sensation obtained through the vision, and to provide a comfortable viewing environment.

Further, the suppression image display includes any image display for suppressing a discrepancy between the sensation perceived by the user due to the movement of the user and the sensation perceived by the user when viewing the image 1. For example, the sensation perceived by the user due to the movement of the user includes the sense perceived by muscles or the like. The image display for suppressing the discrepancy between such a sense and the sensation obtained through the vision may be executed as suppression image display.

Further, the suppression image display includes any image display for enabling the user to view the image 1 in such a manner as to see the scene 3. Further, the suppression image display includes image display for enabling the user to view the image 1 in such a manner that the image 1 is localized in the external space. This makes it possible to achieve a comfortable viewing environment.

Note that the phrase "the user views the image 1 in such a manner that the image 1 is localized in the external space" includes a state of moving together while maintaining a positional relationship with the user in an earth coordinate system. For example, the image 1 is fixed to the external space outside the vehicle without vibrating. The image 1 then moves in accordance with the movement of the vehicle 5 (the movement of the user). The image display viewed by the user in such a manner is also included in the suppression image display.

Of course, each type of the image display included in the suppression image display described above may be compatible with each other. For example, the image display for canceling the influence of the movement (vibration V3) of the projector 12 and the screen 11 may also work as image display in which the image 1 relatively moves in response to the movement (vibration V2) of the user, image display for suppressing the image 1 from moving in response to the movement (vibration V3) of the projector 12 and the screen 11, and the like.

The suppression image display is typically achieved by controlling the display state of the image 1 displayed on the screen 11. For example, the display size of the image 1, the display position of the image 1, the shape of the image 1, and the like are appropriately controlled, and thus the suppression image display is achieved.

Thus, typically, the image display including controlling the display state of the image 1 is executed as the suppression image display. Further, for example, the image display including at least one of the display size of the image 1, the display position of the image 1, or the shape of the image 1 is executed as the suppression image display. Of course, the present technology is not limited to the above. In order to control the display state, other parameters different from the display size of the image 1, the display position of the image 1, and the shape of the image 1 may be controlled.

Figure 7:
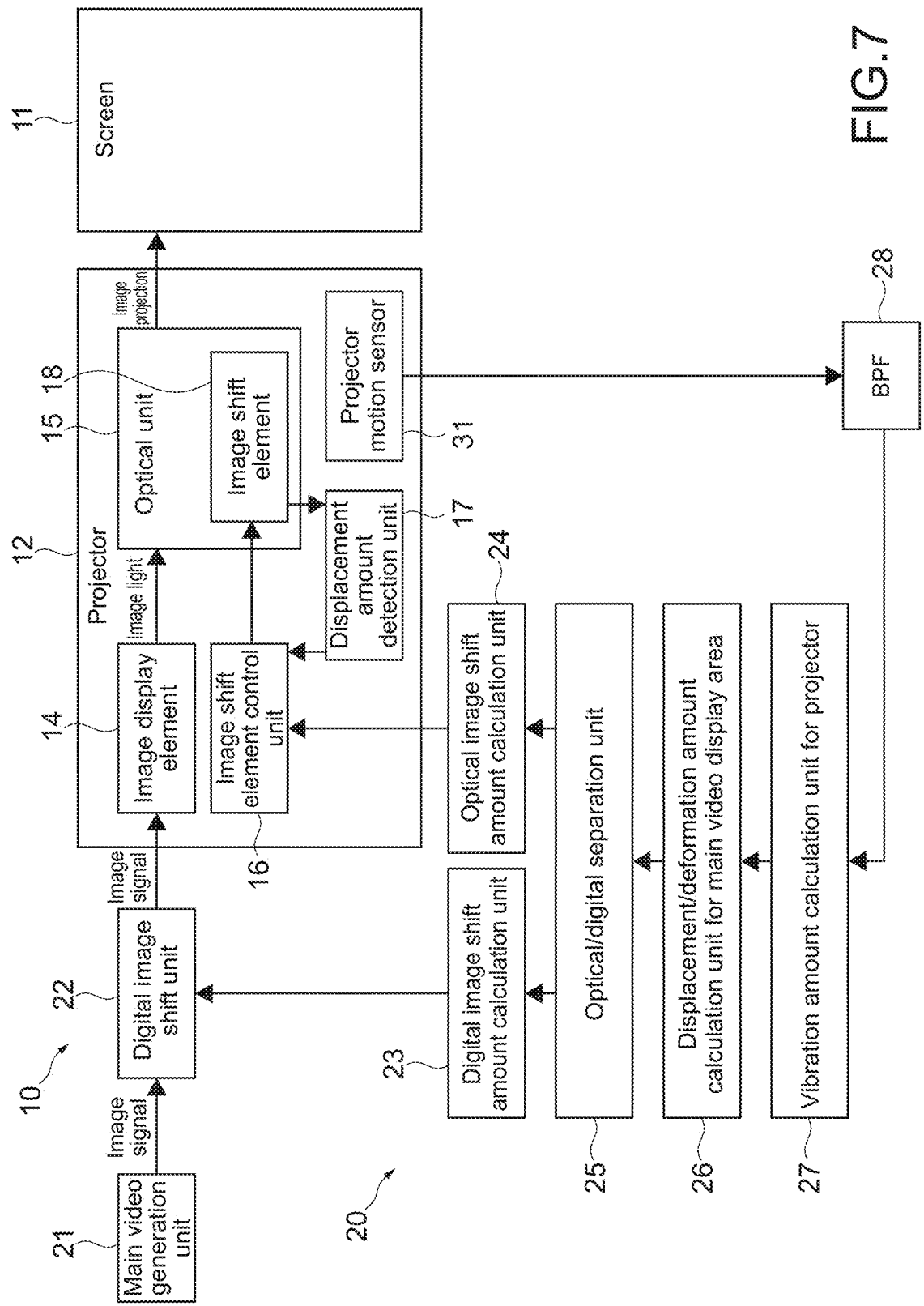
FIG. 7 is a block diagram illustrating a functional configuration example of the image display system.

FIG. 7 is a block diagram illustrating a functional configuration example of the image display system 10. The image display system 10 further includes a display control unit 20.

The display control unit 20 corresponds to an information processing apparatus according to this embodiment, and includes hardware necessary for a computer, such as a central processing unit (CPU), a random access memory (RAM), and a read-only memory (ROM). Each block illustrated in FIG. 7 is configured by the CPU loading, into the RAM, a program according to the present technology that has been recorded in the ROM and executing the program, thus executing an information processing method according to the present technology.

For example, the display control unit 20 can be achieved by any computer such as a personal computer (PC). Further, it is also possible to use a programmable logic device (PLD) such as a field-programmable gate array (FPGA) or another device such as an application-specific integrated circuit (ASIC). Further, in order to achieve each block, dedicated hardware such as an integrated circuit (IC) may be used.

The program is installed on the display control unit 20 via various recording media, for example. Alternatively, the installation of the program may be executed via the Internet, for example.

In this embodiment, the display control unit 20 is included in the output control unit 105 illustrated in FIG. 3. The projector 12 is also included in the output unit 106.

As illustrated in FIG. 7, the display control unit 20 includes a main video generation unit 21, a digital image shift unit 22, a digital image shift amount calculation unit 23, an optical image shift amount calculation unit 24, and an optical/digital separation unit 25. Further, the display control unit 20 includes a displacement/deformation amount calculation unit 26, a vibration amount calculation unit 27, and a band-pass filter (BPF) 28. Each block will be described later together with the behavior of the image display.

Figure 8:
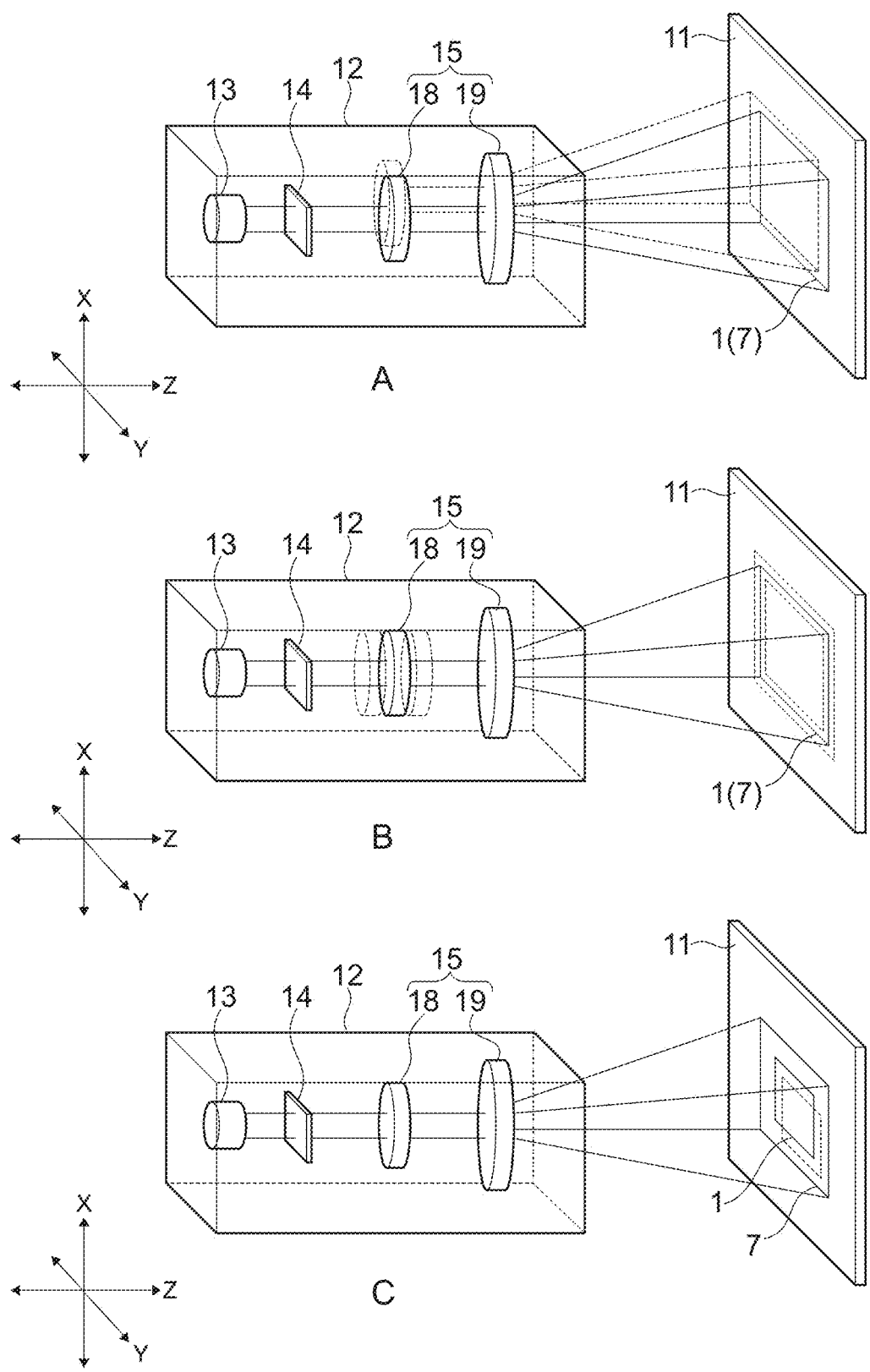
FIG. 8 is a diagram for describing an image shift function of a projector.

FIG. 8 is a diagram for describing an image shift function of the projector 12. With reference to FIGS. 7 and 8, the projector 12 includes a light source 13, an image display element 14, an optical unit 15, an image shift element control unit 16, a displacement amount detection unit 17, and a projector motion sensor 31.

As the light source 13, for example, any light source such as a laser light source, a light-emitting diode (LED), or a lamp light source may be used. The image display element 14 generates image light constituting the image 1 on the basis of the light emitted from the light source 13, and emits the image light to the optical unit 15. As the image display element 14, for example, any image display element such as a liquid crystal panel, an organic electro-luminescence (EL), or a digital micromirror device (DMD) may be used.

The optical unit 15 includes an image shift element 18 and a projection lens system 19. The projection lens system 19 projects the image light generated by the image display element 14 on the screen 11. Thus, the image 1 is displayed on the screen 11. Note that in A and B of FIG. 8, the image 1 is displayed on the entire projection area (in which the image 1 can be projected) 7. That is, the angle of view is set such that the size of the projection area 7 is equal to the size of the image 1.

A specific configuration of the projection lens system 19 is not limited, and the projection lens system 19 may be constituted by various lenses, mirrors, and the like.

The image shift element 18 is capable of optically moving the display position of the image 1 to be projected. The image shift element 18 moves the position of the projection area 7 overall, to move the display position of the image 1.

In this embodiment, the image shift element 18 has a lens function and is disposed on the optical axis of the image light emitted from the image display element 14. It is also possible to cause the image shift element 18 to function as part of the projection lens system 19.

As illustrated in FIG. 8, the optical axis direction of the image light emitted from the image display element 14 is defined as the Z direction, and two directions orthogonal to the Z direction and mutually orthogonal to each other are defined as the X direction and the Y direction. As illustrated in A of FIG. 8, the image shift element 18 is shifted along the XY plane direction (plane direction perpendicular to the optical axis). Thus, the display position of the image 1 to be projected on the screen 11 (the position of the projection area 7) is shifted.

In order to facilitate an intuitive understanding, A of FIG. 8 illustrates the shift direction of the image shift element 18 and the shift direction of the display position of the image 1 so as to be an equal direction, but the present technology is not limited thereto. The shift direction of the image shift element 18 and the shift direction of the display position of the image 1 may be directions opposite to each other. In any case, the display position of the image 1 is moved in a predetermined direction and with a predetermined shift amount in accordance with the shift direction and the shift amount of the image shift element 18.

For example, such an image shift function allows the display state of the image 1 to be controlled. For example, it is assumed that the image 1 vibrates along a plane direction perpendicular to the projection direction (optical axis direction) of the projector 12 due to the vibration of the projector 12 or the like. If the image shift element 18 is shifted along the XY plane direction (plane direction perpendicular to the optical axis), the vibration of the image 1 can be canceled, and the suppression image display can be achieved.

Further, as illustrated in B of FIG. 8, the image shift element 18 is shifted along the Z direction (optical axis direction). Thus, the display size of the image 1 (the size of the projection area 7) is changed. The display size of the image 1 is enlarged or reduced at a ratio corresponding to the shift amount of the image shift element 18.

For example, the display state of the image 1 can be controlled by such an image shift function. For example, it is assumed that the display size of the image 1 minutely varies due to the vibration of the projector 12 or the like. If the image shift element 18 is shifted along the Z direction (optical axis direction), the variation of the display size of the image 1 can be canceled, and the suppression image display can be achieved.

Further, if the image shift element 18 is tilted or rotated, the display state of the image 1 can be controlled. For example, assuming that the X axis illustrated in FIG. 8 is a pitch axis, the Y axis is a yaw axis, and the Z axis is a roll axis, a pitch angle, a yaw angle, and a roll angle are appropriately controlled. Thus, the shape of the image 1 (the shape of the projection area 7) or the like can be controlled.

The behavior of the image shift element 18 is controlled by the image shift element control unit 16 illustrated in FIG. 7. For example, an actuator or the like is configured as the image shift element control unit 16, and power or the like is supplied thereto such that the image shift element 18 is moved with a desired shift amount. Of course the present technology is not limited to such a configuration. Any configuration may be employed as the image shift element 18 and the image shift element control unit 16.

In this embodiment, the image shift element 18 and the image shift element control unit 16 correspond to an image moving mechanism. The image shift element 18 is controlled, and thus the display state can be controlled. That is, in this embodiment, the suppression image display includes control of the image shift element 18.

The displacement amount detection unit 17 illustrated in FIG. 7 detects the displacement amount (shift amount) of the image shift element 18. Note that the image shift element control unit 16 and the displacement amount detection unit 17 may be configured in the display control unit 20.

As illustrated in C of FIG. 8, the image information of the image 1 to be projected is processed, and thus the display position of the image 1 within the projection area 7 can be shifted. For example, an image signal input to the image display element 14 is appropriately processed, and thus the shift of the image 1 can be digitally performed. Note that the image signal input to the image display element 14 includes the image information of the image 1 to be projected. Thus, the processing of the image signal corresponds to the processing of the image information.

Note not only the shift of the image 1 but also the control of the display size of the image 1, the control of the shape of the image 1, or the like can be performed. That is, with the processing of the image information, various types of control regarding the image state can be executed, thus achieving the suppression image display.

The projector motion sensor 31 is a sensor for detecting the motion of the projector 12 and is configured by, for example, an acceleration sensor, a gyro sensor, and a geomagnetic sensor (9-axis sensor). In addition, any other configuration may be employed.

In this embodiment, it is possible to calculate the vibration amount or the like of the projector 12 on the basis of the detection result output by the projector motion sensor 31. For example, it is possible to calculate the vibration amount or the like with respect to the ground on the basis of the earth coordinate system. Of course, the present technology is not limited to the above.

In this embodiment, the projector motion sensor 31 is mounted on the projector 12. The present technology is not limited to the above, and the projector motion sensor 31 may be installed in the vicinity of the projector 12. If the vibration or the like of the projector 12 can be detected, the set position of the projector motion sensor 31 may be optionally set. Note that the projector motion sensor 31 is included in the data acquisition unit 102 illustrated in FIG. 3.

In this embodiment, information such as the detection result output by the projector motion sensor 31 and the vibration amount calculated on the basis of the detection result is included in the movement information regarding the movement of the image display unit. Further, the information such as the detection result and the vibration amount is included in the movement information regarding the movement of the image projection unit.

The movement information regarding the movement of the vehicle 5 may be used to detect the motion of the projector 12. For example, the vibration amount or the like of the vehicle 5 may be used as the vibration amount or the like of the projector 12. Alternatively, an arithmetic operation may be performed on the basis of the vibration amount or the like of the vehicle 5, and the vibration amount or the like of the projector 12 may be calculated.

Figure 9:
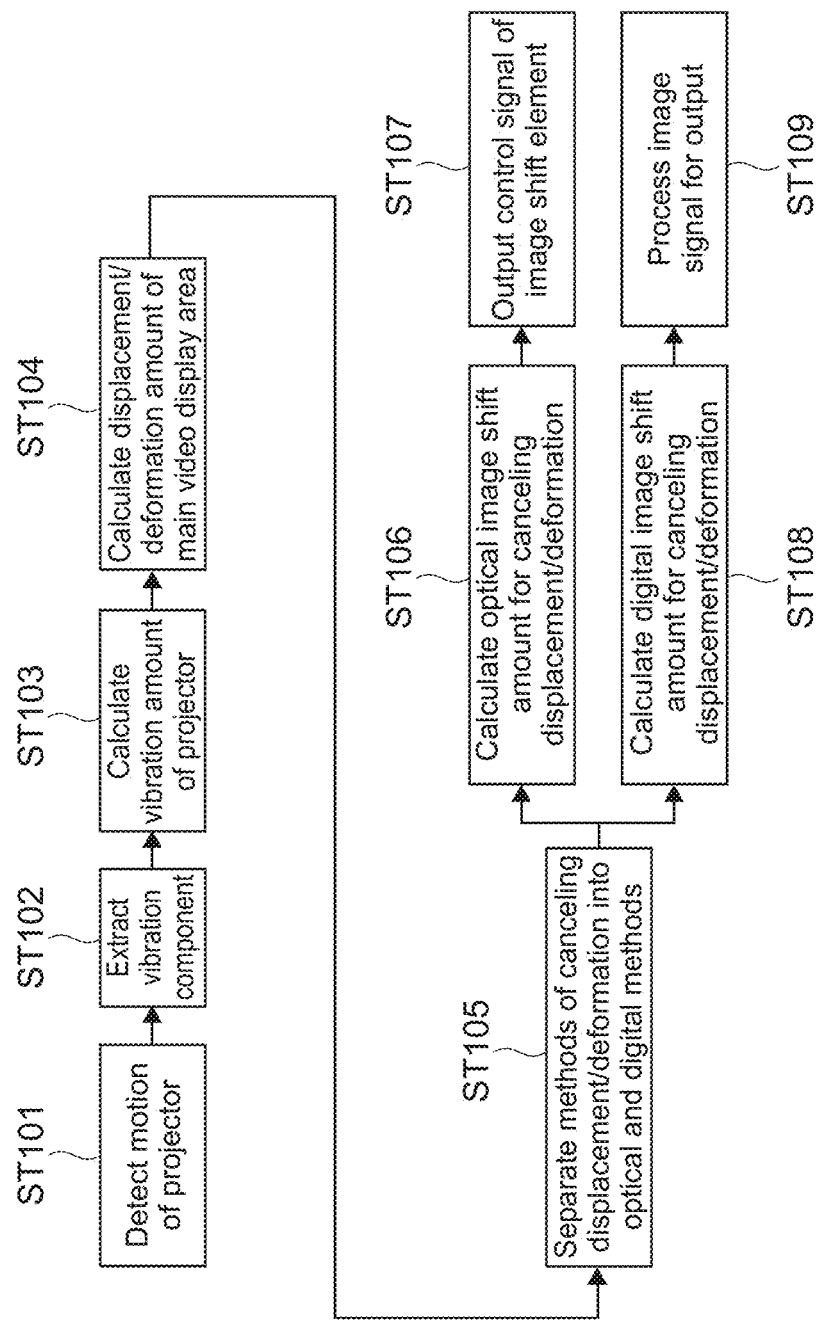
FIG. 9 is a chart illustrating an execution example of suppression image display.

FIG. 9 is a chart illustrating an execution example of the suppression image display. The projector motion sensor 31 detects the motion of the projector 12 (Step 101). The BPF 28 extracts a vibration component of the vehicle 5 from the detection result of the projector motion sensor 31 (Step 102). As described above, in this embodiment, the suppression image display is executed focusing on the vibration component with respect to the ground. Of course, the present technology is not limited to the above.

The setting of filter characteristics for extracting the vibration component from the detection result of the projector motion sensor 31 is not limited. For example, a frequency band corresponding to the vibration component is detected by calibration or the like, and the filter characteristics are then set such that the frequency band is set to a passband.

The vibration amount calculation unit 27 calculates the vibration amount of the projector 12 (Step 103). In this embodiment, the vibration amount with respect to the ground on the basis of the earth coordinate system is calculated. In this embodiment, the projector motion sensor 31, the BPF 28, and the vibration amount calculation unit 27 achieve an acquisition unit that acquires the movement information regarding the movement of the image display unit.

The displacement/deformation amount calculation unit 26 calculates the displacement/deformation amount of the main video display area (Step 104). Note that the main video is a video mainly displayed, and in this embodiment, is the image 1 illustrated in FIG. 2 and the like. For example, subtitles, text information, and the like may be displayed as sub-videos on the main video. In this case, the suppression image display according to the present technology may be executed only for the main video. Alternatively, the suppression image display according to the present technology may be executed for the main video and the sub-video.

Further, the main video display area is an area in which the image 1 is to be displayed, and the position, size, and shape of the main video display area correspond to the display position, display size, and shape of the image 1. In Step 104, information of the displacement of the display position of the image 1 and the variation in display size and shape of the image 1, which corresponds to the vibration amount of the projector 12, is calculated.

Methods of canceling the displacement/deformation of the main video display area by the optical/digital separation unit 25 are separated into two methods: an optical method and a digital method (Step 105). In this embodiment, the methods are separated into the optical method illustrated in A and B of FIG. 8 and the digital method illustrated in B of FIG. 8.

Figure 10:
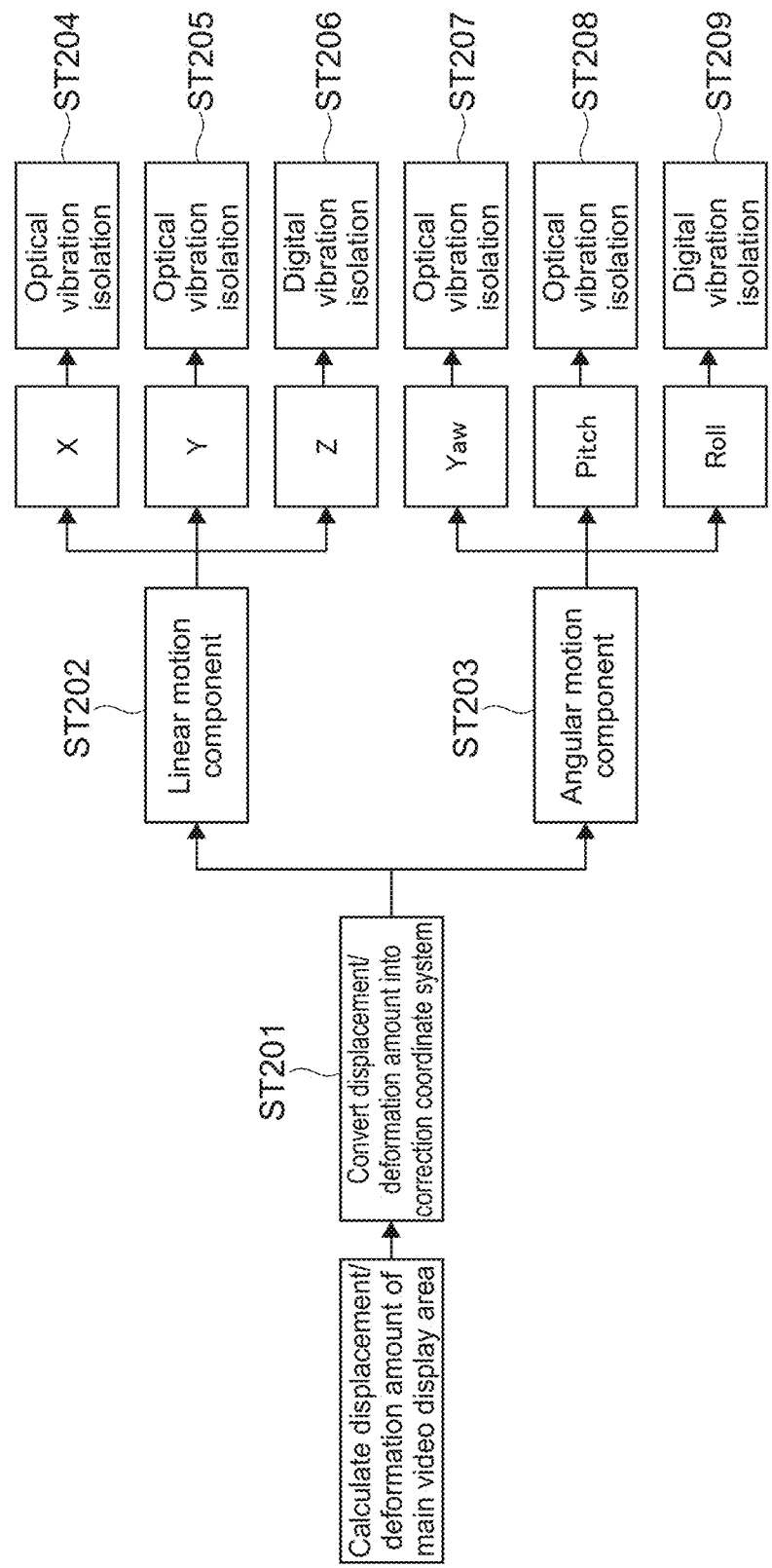
FIG. 10 is a schematic diagram illustrating an example of separating cancellation methods.

FIG. 10 is a schematic diagram illustrating an example of separating the cancellation methods. The optical/digital separation unit 25 converts the displacement/deformation amount into a correction coordinate system (Step 201). In this embodiment, the XYZ coordinate system illustrated in FIG. 8 is used as the correction coordinate system. With the XYZ coordinate system as a reference, the shift amount of the display position of the image 1 and the deformation amount (rotation amount with respect to each axis) are calculated using coordinate values.

The shift amount of the display position of the image 1 and the deformation amount (the rotation amount with respect to each axis), which are converted into the coordinate values, are separated into linear motion components along the X, Y, and Z axes and an angular motion component with reference to each axis (Steps 202 and 203).

For the shifts along the X and Y axis directions among the linear motion components, an optical image shift system is used to move the image shift element 18 illustrated in A of FIG. 8, thus canceling the displacement of the image 1 (Steps 204 and 205). Note that in FIG. 10, the optical image shift system is described as optical vibration isolation.

For the shift along the Z axis direction among the linear motion components, a digital image shift system (control of the display size) for processing the image signal illustrated in C of FIG. 8 is used to cancel the deformation (variation in size) of the image 1 (Step 206). Note that in FIG. 10, the digital image shift system is described as digital vibration isolation.

For the rotation with reference to each of the yaw axis (Y axis) and the pitch axis (X axis) among the angular motion components, the optical image shift system illustrated in A of FIG. 8 is used to cancel the deformation of the image 1 (Steps 207 and 208).

For the rotation with reference to the roll axis (Z axis), the digital image shift system illustrated in C of FIG. 8 is used to cancel the deformation of the image 1 (Step 209). For example, such a separation method allows cancel of the displacement/deformation of the image 1 with high accuracy.

The separation of the methods of canceling the displacement/deformation of the main video display area is not limited to the separation method described above and may be optionally set. For example, an optical method takes precedence, but the following setting is also made possible: the digital method is added when a predetermined stroke exceeds an allowable value. For example, it is also possible to set the separation method on the basis of the response speed, the resolution, and the like of the image display element 14.

Of course, all of the displacements/deformations may be canceled by the optical image shift system of moving the image shift element 18 illustrated in A of FIG. 8. Alternatively, all of the displacements/deformations may be canceled by the digital image shift system of processing the image signal illustrated in C of FIG. 8.

In this embodiment, the calculation of the displacement/deformation amount of the main video display area by the displacement/deformation amount calculation unit 26 corresponds to detection of the influence of the movement of the image display unit on the image to be projected on the basis of the acquired movement information. In order to detect the influence of the movement of the image display unit, a method other than the calculation of the displacement/deformation amount of the main video display area may be used.

Further, the separation of the cancellation methods by the optical/digital separation unit 25 corresponds to setting of the control content of the image moving mechanism and the processing content of the image information on the basis of the detected influence. A specific control content of the image shift element 18 illustrated in A and B of FIG. 8 corresponds to the control content of the image moving mechanism. The processing content of the image signal illustrated in C of FIG. 8 corresponds to the processing content of the image data.

The separation of the cancellation methods is performed, for example, such that the optical method takes precedence over the digital method. This corresponds to setting the control content of the image moving mechanism and the processing content of the image information such that the control of the image moving mechanism takes precedence over the processing of the image information. If the optical method takes precedence, the influence on the cancellation of the displacement/deformation of the image 1 due to the response speed, resolution, or the like of the image display element 14 can be suppressed.

The optical image shift amount calculation unit 24 calculates an optical image shift amount for canceling the displacement/deformation of the image 1 (Step 106). That is, the shift amount of the image shift element 18 is calculated. The optical image shift amount calculation unit 24 calculates a shift amount for each shift direction that is determined when the cancellation methods are separated.

A control signal including the calculated shift amount is output to the image shift element control unit 16 of the projector 12 (Step 107). The image shift element control unit 16 controls the image shift element 18 on the basis of the received control signal.

The digital image shift amount calculation unit 23 calculates a digital image shift amount for canceling the displacement/deformation of the image 1 (Step 108). That is, the shift amount of the image shift element 18 is calculated. Note that the shift amount in the digital image shift system is a parameter including the amount of deformation or the like of the image.

The digital image shift unit 22 processes the image signal transmitted from the main video generation unit 21 on the basis of the calculated shift amount. Thus, an image signal in which the display position and the shape of the image 1 are appropriately changed is output (Step 109).

As illustrated in FIG. 7, the image signal processed by the digital image shift unit 22 is input to the image display element 14, and image light is generated. The generated image light is projected onto the screen 11 by the optical unit 15 including the image shift element 18. Since the image to be projected is subjected to optical correction and digital correction, image display in which the image 1 is displayed while being separated from the vibration of the projector 12 caused by the vibration of the vehicle 5 is achieved. That is, a suppression display image is achieved.

In this embodiment, the display control unit 20 corresponds to a display control unit that causes the image display unit to execute the suppression image display for suppressing the influence of the movement of the image display unit with respect to the external space, on the basis of the acquired movement information. In a case where the display control unit 20 is considered as an information processing apparatus according to the present technology, the BPF 28 and the vibration amount calculation unit 27 function as an acquisition unit. Further, the digital image shift unit 22, the digital image shift amount calculation unit 23, the optical image shift amount calculation unit 24, the optical/digital separation unit 25, the displacement/deformation amount calculation unit 26, and the vibration amount calculation unit 27 function as a display control unit.

Figure 11:
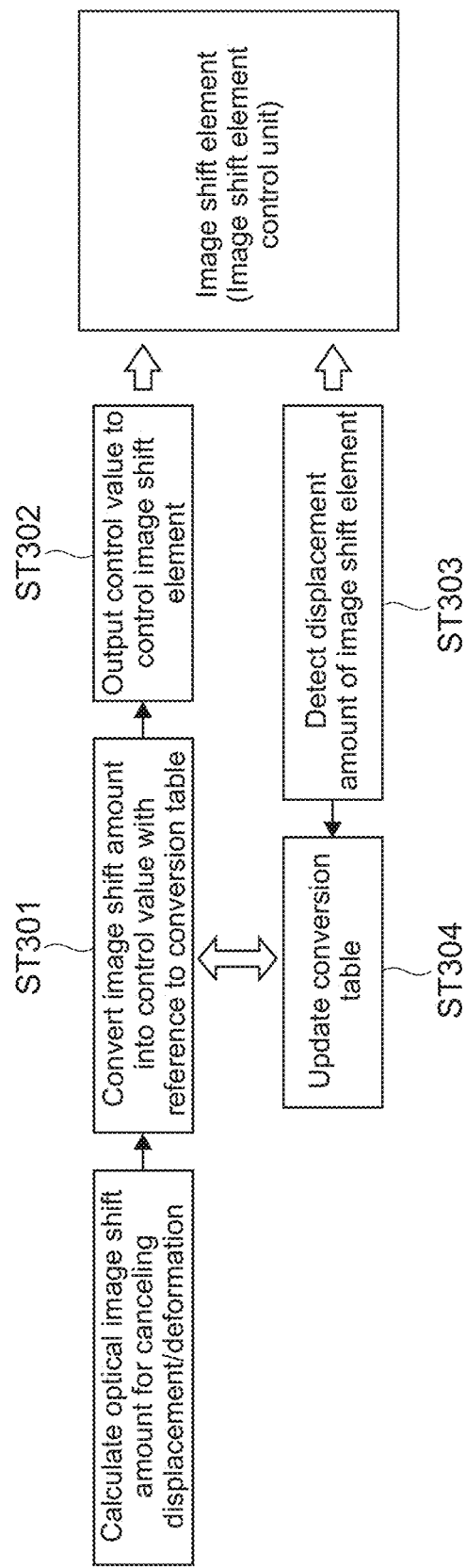
FIG. 11 is a block diagram for describing the control of an image shift element.

FIG. 11 is a block diagram for describing the control of the image shift element 18 by the image shift element control unit 16 illustrated in FIG. 7. In this embodiment, a conversion table for converting the optical image shift amount into a control value for controlling the image shift element is used. The control value is, for example, a current value to be applied to an actuator that moves the image shift element 18. Of course, the present technology is not limited to the above.

With reference to the conversion table, the image shift element control unit 16 converts the optical image shift amount received from the optical image shift amount calculation unit 24 into a control value (Step 301). The image shift element control unit 16 outputs the converted control value to control the image shift element 18 (Step 302).

The displacement amount detection unit 17 detects the displacement amount (shift amount) of the image shift element 18. That is, an actual displacement amount with respect to the input control value is detected (Step 303). The conversion table is updated on the basis of the displacement amount detected by the displacement amount detection unit 17. Feeding back the actual displacement amount of the image shift element 18 in such a manner makes it possible to improve the accuracy of the optical image shift system.

As described above, in the image display system 10 according to this embodiment, it is possible to cause the projector 12 that moves in association with the movement of the user to execute the suppression image display for suppressing the influence of the movement of the projector 12 with respect to the external space. This makes it possible to provide a comfortable viewing environment.

As described above, video equipment is often fixed to a vehicle, and when the vehicle vibrates, the video also vibrates in the same way, which makes it difficult to read as well as being a cause of eye fatigue and motion sickness. The image display system 10 according to this embodiment allows the video to be separated from the vibration of the vehicle and thus allows discomfort due to vibration in viewing a video to be significantly reduced.

Further, even in a case where a video is intended to be superimposed on the scenery outside the vehicle, as in augmented reality (AR) and mixed reality (MR), the video can be separated from the vibration of the vehicle, so that deviations from the scenery can be sufficiently prevented and high-quality image display can be achieved.

It is possible to improve the experiential value of video viewing in the vehicle by reducing the discomfort when watching a video and providing comfortable video viewing. In addition, since the viewing environment in the vehicle is greatly improved, it becomes possible to meet a request for higher-quality video/audio equipment and a request for higher-quality content and thus to achieve an image display system with very high quality.

Second Embodiment

An image display system according to a second embodiment of the present technology will be described. In the following description, descriptions of configurations and operations similar to those of the image display system 10 described in the embodiment above will be omitted or simplified.

In the above embodiment, the suppression image display for suppressing the influence of the vibration of the projector 12 mainly caused by the vibration of the vehicle 5 is executed. In this embodiment, the suppression image display for suppressing the influence of the vibration of the projector 12 and the vibration of the screen 11 is executed.

FIG. 12 is a schematic diagram for describing the outline of the suppression image display according to this embodiment. For example, it is assumed that the displacement/deformation of the image 1 based on the vibration amount of the projector 12 is canceled. As a result, as illustrated in A of FIG. 12, the image 1 may be displaced relative to the screen 11 because of a relative positional relationship with the vibrating screen 11. As an extreme example, for example, the projection area 7 and the image 1 may protrude from the screen 11.

In this embodiment, the display positions or the like of the projection area 7 and the image 1 are optically shifted, or the display area or the like of the image 1 is digitally shifted within the projection area 7, which makes it possible to control the display position or the like of the image 1 with respect to the screen 11. That is, in this embodiment, the suppression display image including a display image for suppressing the influence of a relative movement between the projector 12 serving as an image projection unit and the screen 11 serving as a projected unit is executed.

Figure 13:
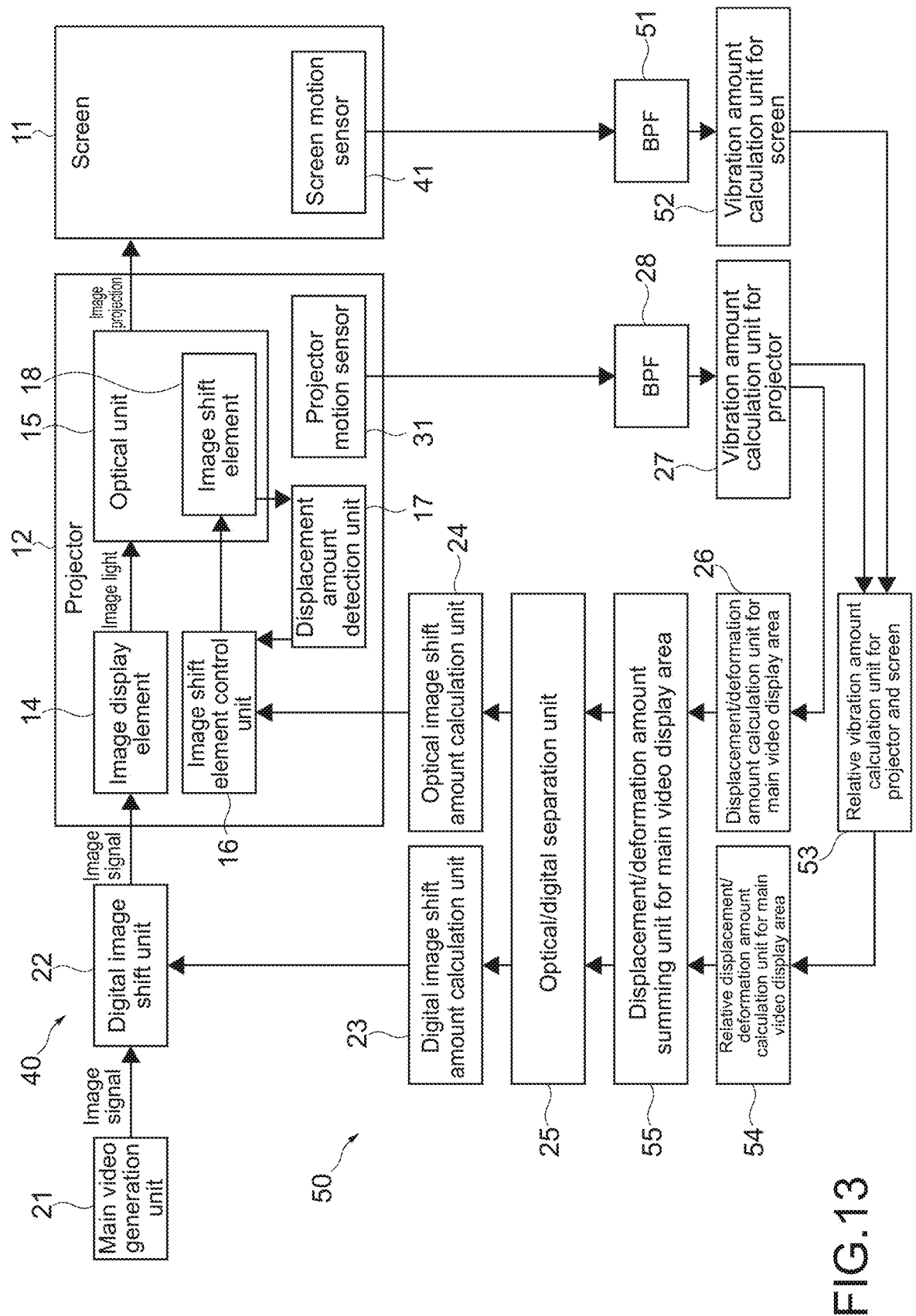
FIG. 13 is a block diagram illustrating a functional configuration example of the image display system.
Figure 14:
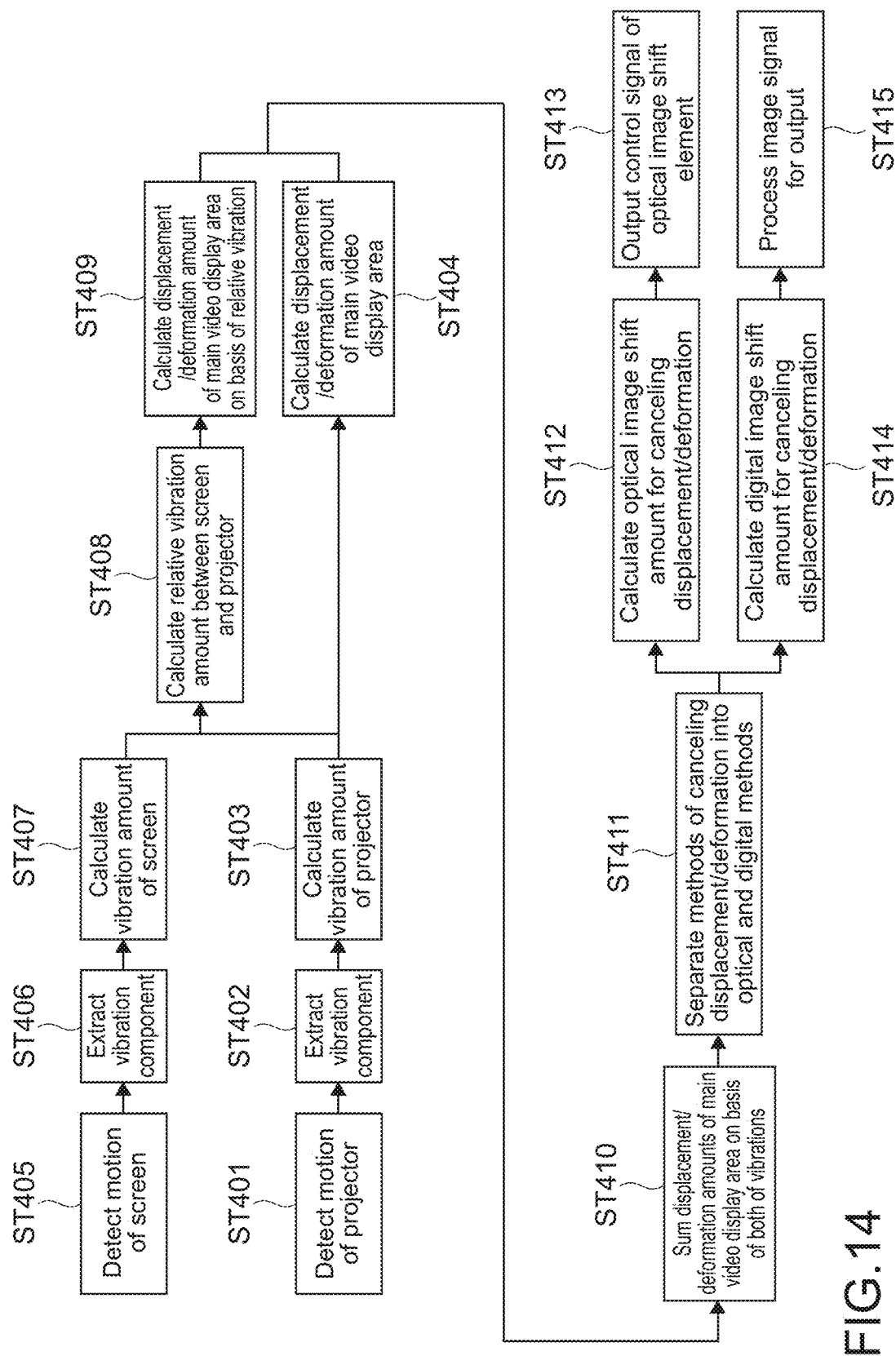
FIG. 14 is a chart illustrating an execution example of the suppression image display.

FIG. 13 is a block diagram illustrating a functional configuration example of an image display system 40 according to this embodiment. FIG. 14 is a chart illustrating an execution example of suppression image display.

Of the blocks illustrated in FIG. 13, blocks different from those of the image display system 10 illustrated in FIG. 7 include a screen motion sensor 41 mounted on the screen 11. Further, such blocks include a BPF 51, a vibration amount calculation unit 52, a relative vibration amount calculation unit 53, a relative displacement/deformation amount calculation unit 54, and a displacement/deformation amount summing unit 55, which are included in a display control unit 50.

The screen motion sensor 41 is a sensor for detecting the motion of the projector 12 and includes, for example, a 9-axis sensor including an acceleration sensor. In addition, any other configuration may be employed.

In this embodiment, it is possible to calculate the vibration amount or the like of the screen 11 on the basis of a detection result output by the screen motion sensor 41. For example, it is possible to calculate the vibration amount or the like with respect to the ground on the basis of the earth coordinate system. Of course, the present technology is not limited to the above.

In this embodiment, the screen motion sensor 41 is mounted on the screen 11. The present invention is not limited to this, and the screen motion sensor 41 may be installed in the vicinity of the screen 11. The set position of the screen motion sensor 41 may be optionally set if the vibration or the like of the screen 11 can be detected. Note that the screen motion sensor 41 is included in the data acquisition unit 102 illustrated in FIG. 3.

In this embodiment, information such as the detection result output by the screen motion sensor 41 and the vibration amount calculated on the basis of the detection result is included in the movement information regarding the movement of the image display unit. Further, the information such as the detection result and the vibration amount is included in the movement information regarding the movement of the projected unit.

The movement information regarding the movement of the vehicle 5 may be used to detect the motion of the screen 11. For example, the vibration amount or the like of the vehicle 5 may be used as the vibration amount or the like of the screen 11. Alternatively, an arithmetic operation may be performed on the basis of the vibration amount or the like of the vehicle 5, and the vibration amount or the like of the screen 11 may be calculated.

Steps 401 to 404 of FIG. 14 are similar to Steps 101 to 104 of FIG. 9. In Steps 405 to 407, the vibration amount of the screen 11 is calculated. Specifically, a vibration component of the screen 11 is extracted from the result detected by the screen motion sensor 41 by the BPF 51. The vibration amount calculation unit 52 then calculates the vibration amount of the screen 11. The screen motion sensor 41, the BPF 51, and the vibration amount calculation unit 52 function as an acquisition unit.

The relative displacement/deformation amount calculation unit 54 calculates a relative vibration amount between the screen 11 and the projector 12 (Step 408). For example, the vibration amount of the projector 12 relative to the screen 11 is calculated.

The relative displacement/deformation amount calculation unit 54 calculates the displacement/deformation amount of the main video display area on the basis of the relative vibration (Step 409). For example, with reference to the screen 11, information including the displacement of the display position of the image 1 displayed thereon and the variation of the display size and shape of the image 1 is calculated.

The displacement/deformation amount summing unit 55 sums the displacement/deformation amounts of the main video display area on the basis of both of the vibrations (Step 410). For example, the displacement of the display position of the image 1 corresponding to the vibration amount of the projector 12 and the displacement of the image 1 with the screen 11 as a reference are summed. Further, the variation of the display size and shape of the image 1 corresponding to the vibration amount of the projector 12, and the variation of the display size and shape of the image 1 with the screen 11 as a reference are summed.

For example, it is assumed that the image 1 is displaced by a predetermined amount in a predetermined direction due to the vibration of the projector 12. Further, as illustrated in A of FIG. 12, it is assumed that the positional relationship between the image 1 and the screen 11 is shifted. In this case, the displacement amount corresponding to the vibration of the projector 12 and the deviation amount of the image 1 with respect to the screen 11 are summed. The same applies to variations in display size and shape.

The cancellation processing described in Steps 105 to 109 is executed on the summed displacement/deformation amount (Steps 411 to 415). For example, the suppression image display is executed such that the displacement/deformation of the image 1 corresponding to the vibration of the projector 12 is preferentially canceled. For example, the displacement/deformation of the image 1 is canceled within a range in which an extreme event, such as protrusion of the image 1 from the screen 11, does not occur.

Alternatively, the suppression image display may be executed such that the displacement/deformation of the image 1 with the screen 11 as a reference is preferentially canceled. Alternatively, the suppression image display may be executed such that the displacement/deformation of the image 1 corresponding to the vibration of the projector 12 and the displacement/deformation of the image 1 with respect to the screen 11 are canceled to the same extent.

Any method for canceling the displacement/deformation of the image 1 may be employed on the basis of the characteristics of the projector 12, the characteristics of the screen 11, what kind of visual effect is produced by the image 1 in the vehicle, the magnitude of the influence such as the displacement of the image 1 with respect to the screen 11, and the like.

As in this embodiment, the suppression image display in consideration of the relative vibration amount between the projector 12 and the screen 11 is executed, and thus it is possible to provide a comfortable viewing environment. Note that the suppression image display may be executed on the basis only on the relative vibration amount between the projector 12 and the screen 11.

FIGS. 15 to 18 are schematic diagrams illustrating variation examples of the image display system. In the example illustrated in A of FIG. 15, as in the example illustrated in FIG. 2, a projector 61 is installed at substantially the central position of the rear seat, and an image is projected toward a screen 62 installed between the front and rear seats.

Figure 15:
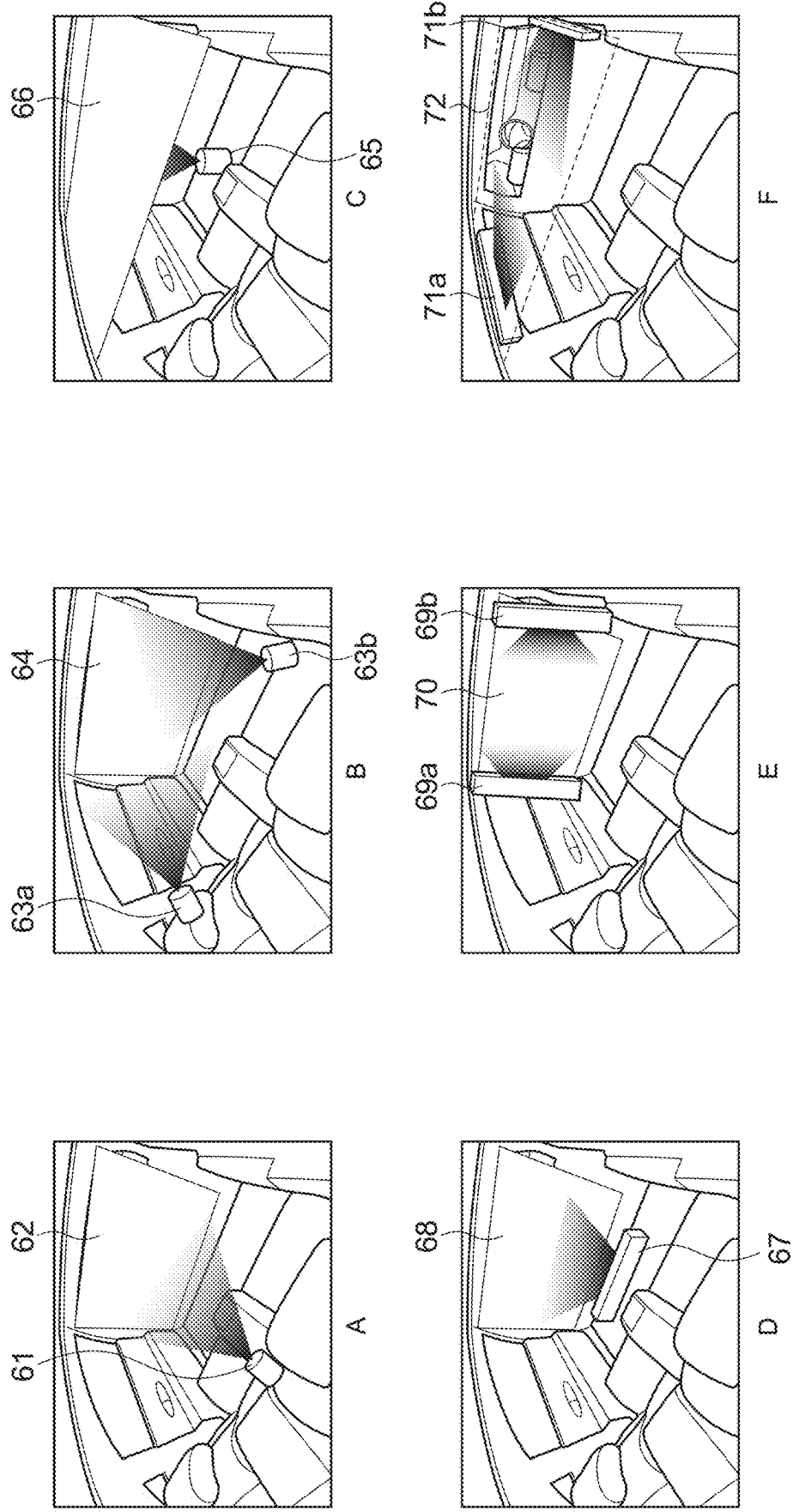
FIG. 15 is a schematic diagram illustrating variation examples of the image display system.

In the example illustrated in B of FIG. 15, two projectors 63a and 63b are disposed at the left and right ends of the rear seat, and images are projected toward a screen 64 installed between the front and rear seats. In the example illustrated in C of FIG. 15, a projector 65 is disposed on the floor at the foot of the rear seat, and an image is projected toward a screen 66 mounted on the ceiling.

In the example illustrated in D of FIG. 15, a short focus projector 67 is disposed on the floor at the foot of the rear seat, and an image is projected from the lower side toward a screen 68 installed between the front and rear seats. In the example illustrated in E of FIG. 15, short focus projectors 69a and 69b are disposed near the inside of the left and right B pillars, and images are projected from the left and right toward a screen 70 disposed between the front and rear seats.

In the example illustrated in D of FIG. 15, short focus projectors 71a and 72b are disposed above the left and right doors of the rear seats, and images are projected from the left and right toward a screen 72 mounted on the ceiling. The present technology is applicable to image display systems of various configurations as illustrated in A to D of FIG. 15. Note that the configurations illustrated in A to D of FIG. 15 can be combined as appropriate.

Figure 16:
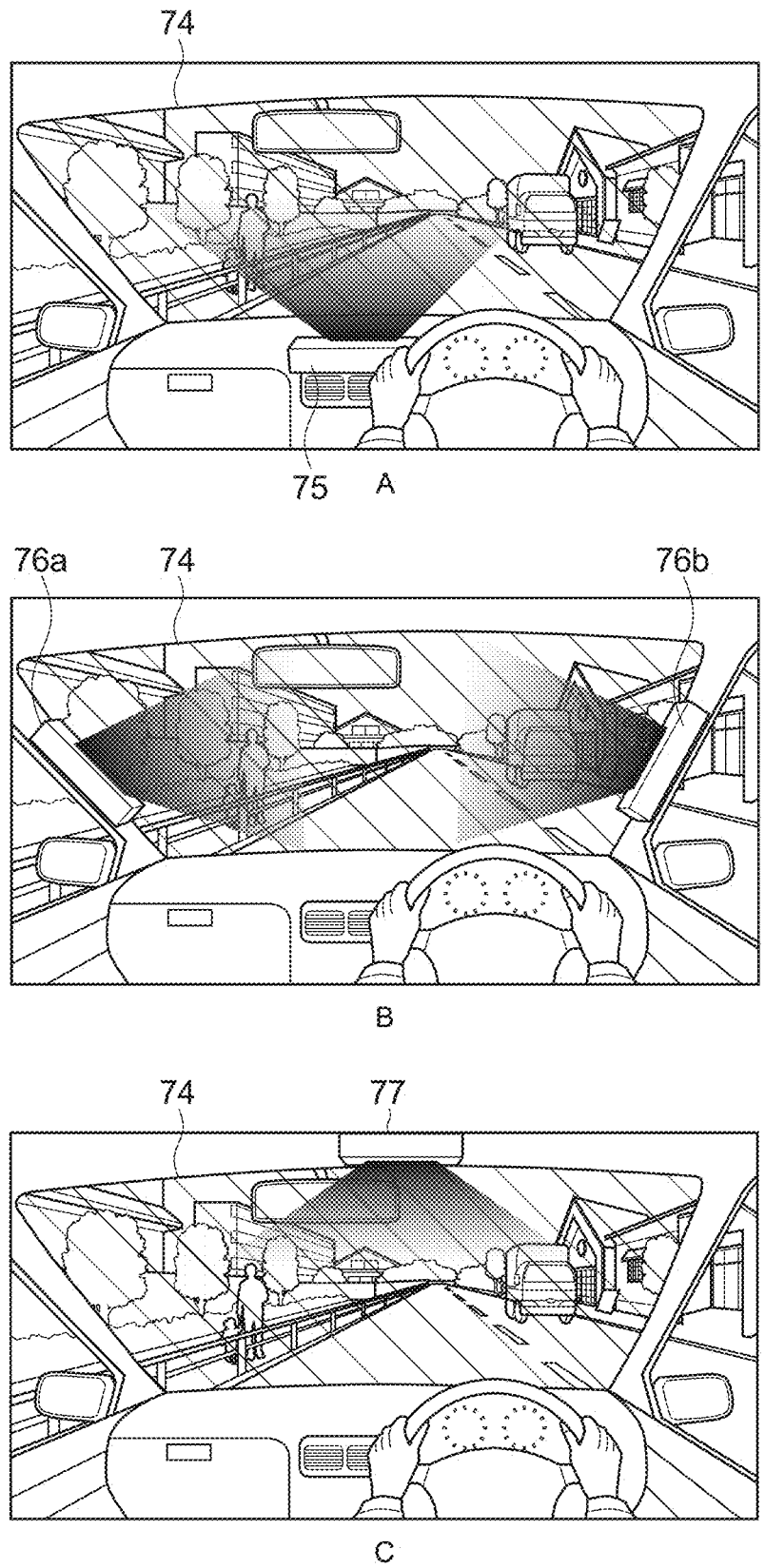
FIG. 16 is a schematic diagram illustrating variation examples of an HUD.

FIGS. 16 and 17 are schematic diagrams illustrating variation examples of a head-up display (HUD). In the HUD illustrated in FIG. 16, front windshield glass 74 functions as a projected unit, and an image is displayed on the entire front windshield glass 74.

In the example illustrated in A of FIG. 16, an image is projected by a short focus projector 75 installed below the front windshield glass 74. The short focus projector 75 may be installed in a dashboard or may be installed in the dashboard.

In the example illustrated in B of FIG. 16, images are projected by short focus projectors 76a and 76b installed on the left and right of the front windshield glass 74. The short focus projectors 76a and 76b may be installed in the left and right A pillars, or may be set outside the left and right A pillars.

In the example illustrated in C of FIG. 16, an image is projected by a short focus projector 77 installed on the upper side of the front windshield glass 74. The present technology is applicable to HUDs of various configurations as illustrated in A to C of FIG. 16. Note that the configurations illustrated in A to C of FIG. 16 can be combined as appropriate.

In FIG. 17, a combiner HUD is illustrated. In the example illustrated in A of FIG. 17, a combiner 78 that functions as a projected unit is installed at a position facing the line of sight of a driver, and an image is projected by a projector 79. This makes it possible for the user (driver) to view a virtual image displayed on a more forward side than front windshield glass 80.

In the example illustrated in B of FIG. 17, front windshield glass 81 is used as a combiner. An image is projected in a predetermined area of the front windshield glass 81 by a projector 82. The user (driver) can view a virtual image displayed on a more forward side than the front windshield glass 81.

The present technology is applicable to HUDs of various configurations as illustrated in A and B of FIG. 17. Note that the configurations illustrated in A and B of FIG. 17 can be combined as appropriate.

In an image display system illustrated in FIG. 18, two projectors 83a and 83b are installed at the left and right ends of the ceiling along a traveling direction. A transmission image is displayed on the entire side surface and the entire ceiling inside the vehicle. The present technology is also applicable to such an image display system.

If autonomous driving is being executed, it is also conceivable that the user often views an image projected on a screen (projected unit) in a state of being free from driving. Using the present technology allows a comfortable viewing environment to be provided, and allows a very high-quality image display system to be achieved.

The present technology is applicable to image display systems mounted on various mobile objects. The image display system according to the present technology can be mounted in, for example, automobiles, electric vehicles, hybrid electric vehicles, motorcycles, bicycles, airplanes, ships, robots, construction machinery, agricultural machinery (tractors), and the like.

Other Embodiments

The present technology is not limited to the embodiments described above and can achieve various other embodiments.

FIGS. 19 to 22 are schematic diagrams for describing an image display system according to other embodiments. In the above embodiments, the case where the image 1 is displayed in the interior space of the vehicle 5 has been exemplified. The present technology is not limited to the above and is applicable to even a case where the image 1 is projected in the external space of the vehicle 5.

For example, as illustrated in A and B of FIG. 19, a projector 85 that functions as an image display unit (image projection unit) is disposed facing forward on the front portion of the vehicle 5. The image 1 is then projected on a road surface 86, which serves as a projection surface, on the front side of the vehicle 5.

The image display system according to the present technology executes the suppression image display for suppressing the influence of the movement (vibration V3) of the projector 85 constituting the image display unit with respect to the external space. This makes it possible for the user (user's eye) to view the image 1 with the same feeling as looking at a scene outside the vehicle. As a result, discomfort such as motion sickness can be reduced, and a comfortable viewing environment can be provided.

As illustrated in A to C of FIG. 20, the image 1 can also be projected on a wall in front of the vehicle 5. For example, the image 1 can be projected on a left wall surface 87a and a right wall surface 87b that are located in front of the vehicle 5 and disposed so as to sandwich the vehicle 5 from the left and right. Further, the image 1 can also be projected on a front left wall surface 88a and a front right wall surface 88b that are located diagonally on the front left and right of the vehicle 5 and face the vehicle 5.

Of course, the image 1 can also be projected not on a wall surface obliquely in front, but on a front wall surface located directly in front. The image 1 can also be projected on a wall surface located on the upper side of the front. The image display system according to the present technology executes the suppression image display, thus allowing a comfortable viewing environment to be provided.

Figure 21:
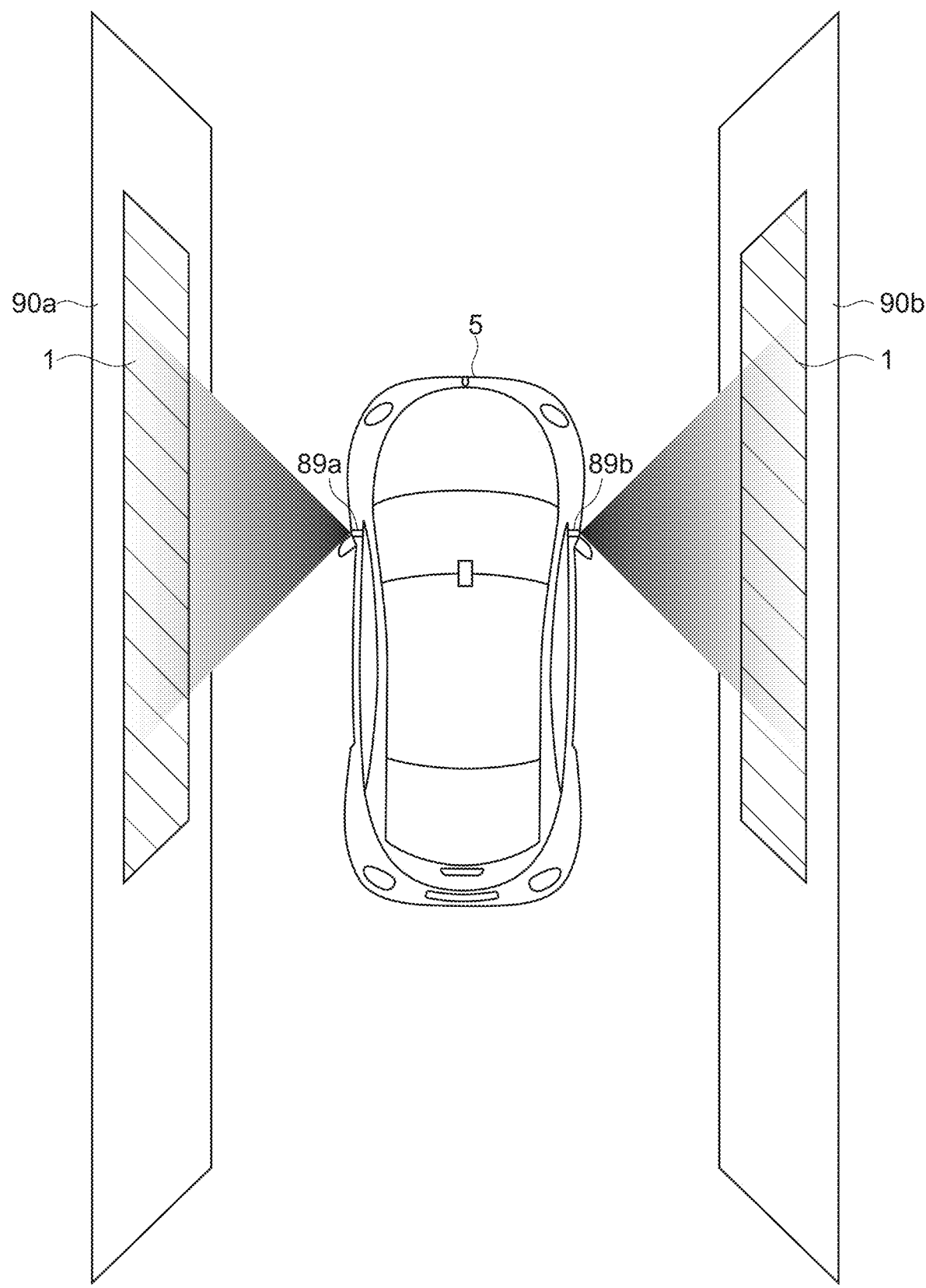
FIG. 21 is a schematic diagram for describing an image display system according to another embodiment.

In the example illustrated in FIG. 21, projectors 89a and 89b are disposed near the left and right door mirrors of the vehicle 5. The images 1 are then projected on a left wall surface 90a and a right wall surface 90b located directly laterally with respect to the vehicle 5. The image display system according to the present technology executes the suppression image display, thus allowing a comfortable viewing environment to be provided.

In the example illustrated in FIG. 22, a motorcycle 91 is used as a mobile object. Projectors 92a and 92b are disposed facing downward on the left and right of the motorcycle 91. As illustrated in A and B of FIG. 22, the images 1 are projected by the projectors 92a and 92b on left and right road surfaces 93a and 93b almost just under the motorcycle 91. The image display system according to the present technology executes the suppression image display, thus allowing a comfortable viewing environment to be provided.

Of course, the method of projecting the image 1 toward the external space, the configuration for projecting the image 1, the position where the image 1 is projected, and the like may be optionally set. Using the present technology allows a comfortable viewing environment to be provided.

Further, in a case where the image 1 is projected toward the external space, the image display separated from the vibration of the projector (image display unit) is achieved even for a person other than the user who rides and moves on the mobile object. That is, it is possible to provide a comfortable viewing environment for a person in the external space. Of course, it is possible to provide various types of content for a person in the external space considered as a user of the image display system according to the present technology.

Figure 23:
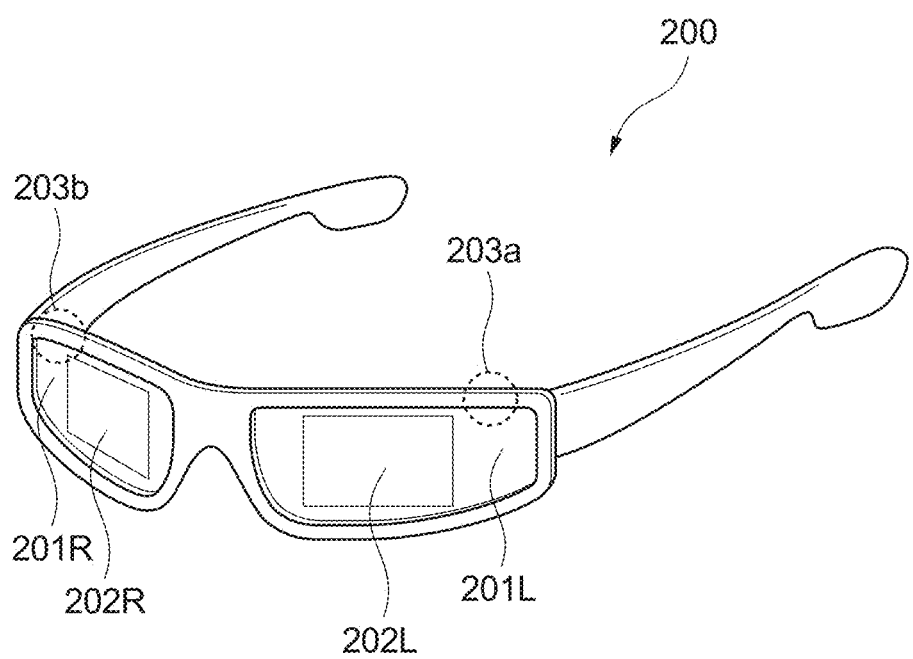
FIG. 23 is a perspective view illustrating a configuration example of an HMD to which an image display system according to the present technology can be applied.

FIG. 23 is a perspective view illustrating a configuration example of a head-mounted display (HMD) to which the image display system according to the present technology is applicable. A HMD 200 illustrated in FIG. 23 is a glasses-type device including a transmissive display and is used by being worn on the head of a user. When the user moves, the HMD 200 also moves in conjunction with the movement of the user. For example, if the user's head vibrates when walking or traveling, the HMD 200 also vibrates. The movement of the user and that of the HMD 200 are associated with each other.

The HMD 200 includes left and right lenses 201L and 201R, a left-eye display 202L and a right-eye display 202R, and sensor units 203L and 203R. The left and right lenses 201L and 201R are disposed in front of the left eye and the right eye of the user, respectively. The left-eye and right-eye displays 202L and 202R are provided on the left and right lenses 201L and 201R, respectively, so as to cover the field of view of the user.

The left-eye and right-eye displays 202L and 202R are transmissive displays, and images or the like for the left eye and the right eye are respectively displayed thereon. The user wearing the HMD 200 can view an actual scene and at the same time view the images displayed on the respective displays. The user can thus experience an augmented reality (AR) or the like.

As the left-eye and right-eye displays 202L and 202R, for example, a transmissive organic electro-luminescence display, a liquid crystal display (LCD), or the like is used. The left-eye and right-eye displays 202L and 202R function as an image display unit.

The sensor units 203L and 203R include, for example, an acceleration sensor, a gyro sensor, a geomagnetic sensor (9-axis sensor), and the like, and can calculate vibration amounts of the respective left-eye and right-eye displays 202L and 202R, which are generated in accordance with the movement of the user.

The suppression image display according to the present technology is executed such that the images displayed on the left-eye and right-eye displays 202L and 202R are viewed while being separated from the vibrations of the left-eye and right-eye displays 202L and 202R (vibration of HMD 200). For example, if image information is appropriately processed, the display states of the images displayed on the left-eye and right-eye displays 202L and 202R are controlled. In a case where the left-eye and right-eye displays 202L and 202R are configured to be movable, the left-eye and right-eye displays 202L and 202R may be moved.

The image display system according to the present technology may be mounted on a wearable object to be worn by the user in such a manner. The wearable object is not limited to the HMD, and other wearable devices, helmets, and the like can be used. For example, when the HUD is mounted on a full-face helmet, the present technology is applied thereto and allows a comfortable viewing environment to be achieved.

In the above description, the control of the image shift element and the processing of the image information have been exemplified as the control of the display state. The present technology is not limited to the above, and the display state of the image may be controlled by shifting/rotating the projector itself. Further, the display state of the image may be controlled by shifting/rotating the image display element.

In the above description, the case where the projector is used as the image display system has been described. However, an organic EL display or an LCD may be used. The display state of the image may be controlled by shifting/rotating such a display.

Examples of the method capable of reducing discomfort such as motion sickness include image display that makes the user conscious about the earth coordinate system. That is, it is the image display that makes the user less conscious about the interior space of the vehicle. For example, it is possible to make the user conscious about the earth coordinate system by achieving such things as projecting a main video on a window, projecting a virtual image outside the window, showing a large image covering the field of view, making the interior of the vehicle darker (making only the main video appear floating), and showing a peripheral image, which reflects the motion of the outside of the vehicle, inside the vehicle. If the suppression image display described above is combined with the image display that makes the user conscious about the earth coordinate system, it is possible to provide a more comfortable viewing environment.

The information processing method and the program according to the present technology may be executed not only in a computer system configured by a single computer but also in a computer system in which a plurality of computers operates in conjunction with each other. Note that, in the present disclosure, the system means an aggregate of a plurality of components (such as apparatuses or modules (parts)) and it does not matter whether or not all the components are housed in the identical casing. Therefore, a plurality of apparatuses housed in separate casings and connected to one another via a network, and a single apparatus having a plurality of modules housed in a single casing are both the system.

The execution of the information processing method and the program according to the present technology by the computer system includes both cases where, for example, acquisition of movement information, execution control of the suppression image display, and the like are executed by a single computer and where each process is executed by a different computer. Further, the execution of each process by a specified computer includes causing another computer to execute part of or all of the processes and acquiring a result of the execution.

In other words, the information processing method and the program according to the present technology are also applicable to a cloud computing configuration in which one function is shared and cooperatively processed by a plurality of apparatuses via a network.

The flow and the like of the image display system or the suppression image display described with reference to the drawings are merely one embodiment and can be optionally modified without departing from the gist of the present technology. In other words, any other configurations, algorithms, and the like for practicing the present technology may be employed.

For example, any machine-learning algorithm using, e.g., a deep neural network (DNN) may be used to perform the suppression image display. For example, by using artificial intelligence (AI) or the like for performing deep learning, it is possible to improve the accuracy of cancellation of vibration or the like.

In the present disclosure, "center", "equal", "perpendicular", "orthogonal", and the like are concepts including "substantially center", "substantially equal", "substantially perpendicular", and "substantially orthogonal". For example, the above concepts also include a state included in a predetermined range (e.g., ±10%) with "perfectly center", "perfectly equal", "perfectly perpendicular", "perfectly orthogonal", or the like being as a reference.

Out of the feature parts according to the present technology described above, at least two feature parts can be combined. That is, the various feature parts described in the respective embodiments may be optionally combined irrespective of the embodiments. Further, various effects described above are merely examples and are not limited, and other effects may be exerted.

Note that the present technology may also be configured as below.

(1) An image display system, including:
an image display unit that is capable of displaying an image and moves in association with a movement of a user;
an acquisition unit that acquires movement information regarding a movement of the image display unit; and
a display control unit that causes the image display unit to execute suppression image display for suppressing an influence of the movement of the image display unit with respect to an external space on the basis of the acquired movement information.

(2) The image display system according to (1), in which
the suppression image display includes image display for canceling the influence of the movement of the image display unit.

(3) The image display system according to (1) or (2), in which
the suppression image display includes image display for moving the image relative to the user in response to the movement of the user.

(4) The image display system according to any one of (1) to (3), in which
the suppression image display includes image display for suppressing the image from moving in response to the movement of the image display unit.

(5) The image display system according to any one of (1) to (4), in which
the suppression image display includes image display for suppressing a discrepancy between a sensation perceived by the user due to the movement of the user and a sensation perceived by the user when viewing the image.
(6) The image display system according to any one of (1) to (5), in which
the suppression image display includes image display for enabling the user to view the image in such a manner as to see a scene.
(7) The image display system according to any one of (1) to (6), in which
the suppression image display includes image display for controlling a display state of the image.
(8) The image display system according to (7), in which
the suppression image display includes controlling at least one of a display size of the image, a display position of the image, or a shape of the image.
(9) The image display system according to any one of (1) to (8), in which
the image display unit includes
an image projection unit that projects the image, and
a projected unit on which the image is to be projected, and
the movement information includes at least one of movement information regarding a movement of the image projection unit or movement information regarding a movement of the projected unit.
(10) The image display system according to (9), in which
the suppression image display includes image display for suppressing an influence of a relative movement between the image projection unit and the projected unit.
(11) The image display system according to (9) or (10), in which
the image projection unit includes an image moving mechanism capable of optically moving a display position of the image to be projected, and
the suppression image display includes control of the image moving mechanism.
(12) The image display system according to any one of (9) to (11), in which
the suppression image display includes moving the image within a projection area of the image projection unit by processing image information of the image to be projected.
(13) The image display system according to (11), in which
the suppression image display includes moving the image within a projection area of the image projection unit by processing image information of the image to be projected, and
the display control unit detects the influence of the movement of the image display unit on the image to be projected on the basis of the acquired movement information, and sets each of a control content of the image moving mechanism and a processing content of the image information on the basis of the detected influence.
(14) The image display system according to (13), in which
the display control unit sets each of the control content of the image moving mechanism and the processing content of the image information such that the control of the image moving mechanism takes precedence over processing of the image information.
(15) The image display system according to any one of (1) to (14), which is mounted on a mobile object capable of moving the user riding thereon.
(16) The image display system according to any one of (1) to (14), which is mounted on a wearable object to be worn by the user.
(17) An information processing apparatus, including:
an acquisition unit that acquires movement information regarding a movement of an image display unit that is capable of displaying an image and moves in association with a movement of a user; and
a display control unit that causes the image display unit to execute suppression image display for suppressing an influence of the movement of the image display unit with respect to an external space on the basis of the acquired movement information.
(18) An information processing method that is executed by a computer system, the information processing method including:
acquiring movement information regarding a movement of an image display unit that is capable of displaying an image and moves in association with a movement of a user; and
executing, by the image display unit, suppression image display for suppressing an influence of the movement of the image display unit with respect to an external space on the basis of the acquired movement information.
(19) A program that causes a computer system to execute the steps of:
acquiring movement information regarding a movement of an image display unit that is capable of displaying an image and moves in association with a movement of a user; and
executing, by the image display unit, suppression image display for suppressing an influence of the movement of the image display unit with respect to an external space on the basis of the acquired movement information.
(20) A mobile object, including:
a main body unit including a riding unit on which a user is capable of riding;
an image display unit that is provided to the main body unit and is capable of displaying an image;
an acquisition unit that acquires movement information regarding a movement of the image display unit provided to the main body unit; and
a display control unit that causes the image display unit to execute suppression image display for suppressing an influence of the movement of the image display unit with respect to an external space on the basis of the acquired movement information.

REFERENCE SIGNS LIST 1 image
2 user's eye
3 scene
5 vehicle
7 projection area
10, 40 image display system
11, 62, 64, 66, 70, 72 screen
12, 61, 63a, 63b, 65, 79, 82, 83a, 83b, 85, 89a, 89b, 92a, 92b projector
16 image shift element control unit
18 image shift element
20, 50 display control unit
31 projector motion sensor
41 screen motion sensor
67, 69a, 69b, 71a, 71b, 75, 76a, 76b, 77 short focus projector
74, 80, 81 front windshield glass
78 combiner
91 motorcycle
100 vehicle control system
200 HMD 202R right-eye display
202L left-eye display
203L, 203R sensor unit

The invention claimed is:

1. An image display device, which moves in association with a movement of a user, comprising circuitry configured to:
display an image;
acquire movement information regarding a movement of the image display device; and
suppress an influence of the movement of the image display device with respect to an external space on a basis of the acquired movement information,
wherein the image display device further includes a projector having a lens configured to move along an optical axis and to shift along a plane direction perpendicular to the optical axis, and
wherein the circuitry is further configured to:
move the lens along the optical axis to suppress changes in display size of the displayed image; and
adjust the lens along the plane direction perpendicular to the optical axis to suppress vibration of the image.

2. The image display device according to claim 1, wherein the circuitry is further configured to cancel the influence of the movement of the image display unit.

3. The image display device according to claim 1, wherein the circuitry is further configured to move the image relative to the user in response to the movement of the user.

4. The image display device according to claim 1, wherein the circuitry is further configured to suppress the image from moving in response to the movement of the image display device.

5. The image display device according to claim 1, wherein the circuitry is further configured to suppress a discrepancy between a sensation perceived by the user due to the movement of the user and a sensation perceived by the user when viewing the image.

6. The image display device according to claim 1, wherein the circuitry is further configured to control a display state of the image.

7. The image display device according to claim 6, wherein the circuitry is further configured to control at least one of a display size of the image, a display position of the image, or a shape of the image.

8. The image display device according to claim 1, wherein the projector is configured to project the image onto a screen, and
wherein the movement information includes at least one of movement information regarding a movement of the projector or movement information regarding a movement of the screen.

9. The image display device according to claim 8, wherein the circuitry is further configured to suppress an influence of a relative movement between the projector and the screen.

10. The image display device according to claim 8, wherein the image projection unit projector includes an actuator to move and adjust the position of the lens, and
wherein the circuitry is further configured to control the actuator to move and adjust the position of the lens based on the movement information.

11. The image display device according to claim 10, wherein the circuitry is further configured to move the image within a projection area of the projector by processing image information of the image to be projected, and
wherein the circuitry is further configured to detect the influence of the movement of the image display device on the image to be projected on a basis of the acquired movement information and set each of a control content of the actuator and a processing content of the image information on a basis of the detected influence.

12. The image display device according to claim 11, wherein the circuitry is further configured to set each of the control content of the actuator and the processing content of the image information such that the control of the actuator takes precedence over processing of the image information.

13. The image display device according to claim 8, wherein the circuitry is further configured to move the image within a projection area of the projector by processing image information of the image to be projected.

14. The image display device according to claim 1, which is mounted on a mobile object capable of moving the user riding thereon.

15. The image display device according to claim 1, which is mounted on a wearable object worn by the user.

16. An information processing apparatus, comprising circuitry configured to:
acquire movement information regarding a movement of an image display device that includes a projector configured to display an image and move in association with a movement of a user, the projector having a lens configured to move along an optical axis and to shift along a plane direction perpendicular to the optical axis; and
suppress an influence of the movement of the image display device with respect to an external space on a basis of the acquired movement information,
wherein suppressing the influence of the movement of the image display device includes the circuitry being further configured to send one or more control signals to the image display device to move the lens along the optical axis to suppress changes in display size of the displayed image and to adjust the lens along the plane direction perpendicular to the optical axis to suppress vibration of the image.

17. An information processing method that is executed by a computer system, the information processing method comprising:
acquiring movement information regarding a movement of an image display device that includes a projector configured to display an image and move in association with a movement of a user, the projector having a lens configured to move along an optical axis and to shift along a plane direction perpendicular to the optical axis; and
suppressing an influence of the movement of the image display device with respect to an external space on a basis of the acquired movement information,
wherein suppressing the influence of the movement of the image display device further includes sending one or more control signals to the image display device to move the lens along the optical axis to suppress changes in display size of the displayed image and to adjust the lens along the plane direction perpendicular to the optical axis to suppress vibration of the image.

18. A non-transitory, computer-readable medium storing instructions that, when executed by a processor in the computer, control the computer to implement a method comprising:
acquiring movement information regarding a movement of an image display device that includes a projector configured to display an image and move in association with a movement of a user, the projector having a lens configured to move along an optical axis and to shift along a plane direction perpendicular to the optical axis; and suppressing an influence of the movement of the image display device with respect to an external space on a basis of the acquired movement information, wherein suppressing the influence of the movement of the image display device further includes sending one or more control signals to the image display device to move the lens along the optical axis to suppress changes in display size of the displayed image and to adjust the lens along the plane direction perpendicular to the optical axis to suppress vibration of the image.

19. A mobile object, comprising:

a main body configured to enable a user to ride within the main body;

an image display device provided within the main body unit that displays an image and moves in association with a movement of the user; and circuitry configured to:

acquire movement information regarding a movement of the image display device; and suppress an influence of the movement of the image display device with respect to an external space on a basis of the acquired movement information wherein the image display device further includes a projector having a lens configured to move along an optical axis and to shift along a plane direction perpendicular to the optical axis, and wherein the circuitry is further configured to:

move the lens along the optical axis to suppress changes in display size of the displayed image; and adjust the lens along the plane direction perpendicular to the optical axis to suppress vibration of the image.

* * * * *